United States Patent
Dekel et al.

(10) Patent No.: US 11,315,274 B2
(45) Date of Patent: Apr. 26, 2022

(54) DEPTH DETERMINATION FOR IMAGES CAPTURED WITH A MOVING CAMERA AND REPRESENTING MOVING FEATURES

(71) Applicant: Google LLC, Mountain View, CA (US)

(72) Inventors: Tali Dekel, Arlington, MA (US); Forrester Cole, Lexington, MA (US); Ce Liu, Cambridge, MA (US); William Freeman, Acton, MA (US); Richard Tucker, New York, NY (US); Noah Snavely, New York, NY (US); Zhengqi Li, New York, NY (US)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 16/578,215

(22) Filed: Sep. 20, 2019

(65) Prior Publication Data

US 2021/0090279 A1 Mar. 25, 2021

(51) Int. Cl.
*G06T 7/00* (2017.01)
*G06T 7/579* (2017.01)
(Continued)

(52) U.S. Cl.
CPC .............. *G06T 7/579* (2017.01); *G06T 7/246* (2017.01); *G06T 7/73* (2017.01);
(Continued)

(58) Field of Classification Search
None
See application file for complete search history.

(56) References Cited

U.S. PATENT DOCUMENTS

| 2012/0183238 A1* | 7/2012 | Savvides | G06K 9/00281 |
| | | | 382/285 |
| 2013/0141539 A1* | 6/2013 | Awazu | H04N 13/218 |
| | | | 348/46 |

(Continued)

FOREIGN PATENT DOCUMENTS

| WO | WO-2012001947 A1 * | 1/2012 | ......... H04N 5/23219 |
| WO | WO-2019164497 A1 * | 8/2019 | |
| WO | WO-2020051270 A1 * | 3/2020 | ............... G06T 7/73 |

OTHER PUBLICATIONS

Competitive Collaboration: Joint Unsupervised Learning of Depth, Camera Motion, Optical Flow and Motion Segmentation. Ranjan et al. Jun. 2019 (Year: 2019).*

(Continued)

*Primary Examiner* — Delomia L Gilliard
(74) *Attorney, Agent, or Firm* — McDonnell Boehnen Hulbert & Berghoff LLP

(57) ABSTRACT

A method includes obtaining a reference image and a target image each representing an environment containing moving features and static features. The method also includes determining an object mask configured to mask out the moving features and preserves the static features in the target image. The method additionally includes determining, based on motion parallax between the reference image and the target image, a static depth image representing depth values of the static features in the target image. The method further includes generating, by way of a machine learning model, a dynamic depth image representing depth values of both the static features and the moving features in the target image. The model is trained to generate the dynamic depth image by determining depth values of at least the moving features based on the target image, the object mask, and the static depth image.

20 Claims, 13 Drawing Sheets

(51) Int. Cl.
*G06T 7/246* (2017.01)
*G06T 7/73* (2017.01)

(52) U.S. Cl.
CPC .............. *G06T 2207/10016* (2013.01); *G06T 2207/10028* (2013.01); *G06T 2207/20081* (2013.01); *G06T 2207/30244* (2013.01)

(56) References Cited

U.S. PATENT DOCUMENTS

| | | | | |
|---|---|---|---|---|
| 2014/0184852 | A1* | 7/2014 | Niemi | H04N 5/2356 348/239 |
| 2015/0248590 | A1* | 9/2015 | Li | G06T 7/194 382/103 |
| 2015/0358606 | A1* | 12/2015 | Maleki | G06T 7/97 348/43 |
| 2016/0267325 | A1* | 9/2016 | Sundaresan | G06K 9/00624 |
| 2017/0127046 | A1* | 5/2017 | Das | H04N 13/204 |
| 2017/0286774 | A1* | 10/2017 | Gaidon | G06K 9/00805 |
| 2018/0025496 | A1* | 1/2018 | Lindner | G06T 15/04 382/154 |
| 2019/0050693 | A1* | 2/2019 | Taghavi | G06K 9/00718 |
| 2019/0114804 | A1* | 4/2019 | Sundaresan | G06K 9/66 |
| 2020/0211206 | A1* | 7/2020 | Wang | G06N 20/00 |
| 2020/0320720 | A1* | 10/2020 | Baig | G06T 7/246 |
| 2021/0004976 | A1* | 1/2021 | Guizilini | G06K 9/00201 |
| 2021/0012568 | A1* | 1/2021 | Mlchlelln | G06T 7/55 |

OTHER PUBLICATIONS

Self-supervised Learning for Single View Depth and Surface Normal Estimation. Zhan et al. Mar. 2019 (Year: 2019).*

Tali Dekel, Forrester Cole, Ce Liu, William Freeman, Richard Tucker, Noah Snavely, Zhengqi Li, Learning the Depths of Moving People by Watching Frozen People, arXiv, Published Apr. 25, 2019.

Tali Dekel, Forrester Cole, Ce Liu, William Freeman, Richard Tucker, Noah Snavely, Zhengqi Li, Moving Camera, Moving People: A Deep Learning Approach to Depth Prediction, Google AI Blog, Published May 23, 2019, https://ai.googleblog.com/2019/05/moving-camera-moving-people-deep.html.

Tali Dekel, Forrester Cole, Ce Liu, William Freeman, Richard Tucker, Noah Snavely, Zhengqi Li, Learning the Depths of Moving People by Watching Frozen People, github, Published May 23, 2019, https://mannequin-depth.github.io/.

* cited by examiner

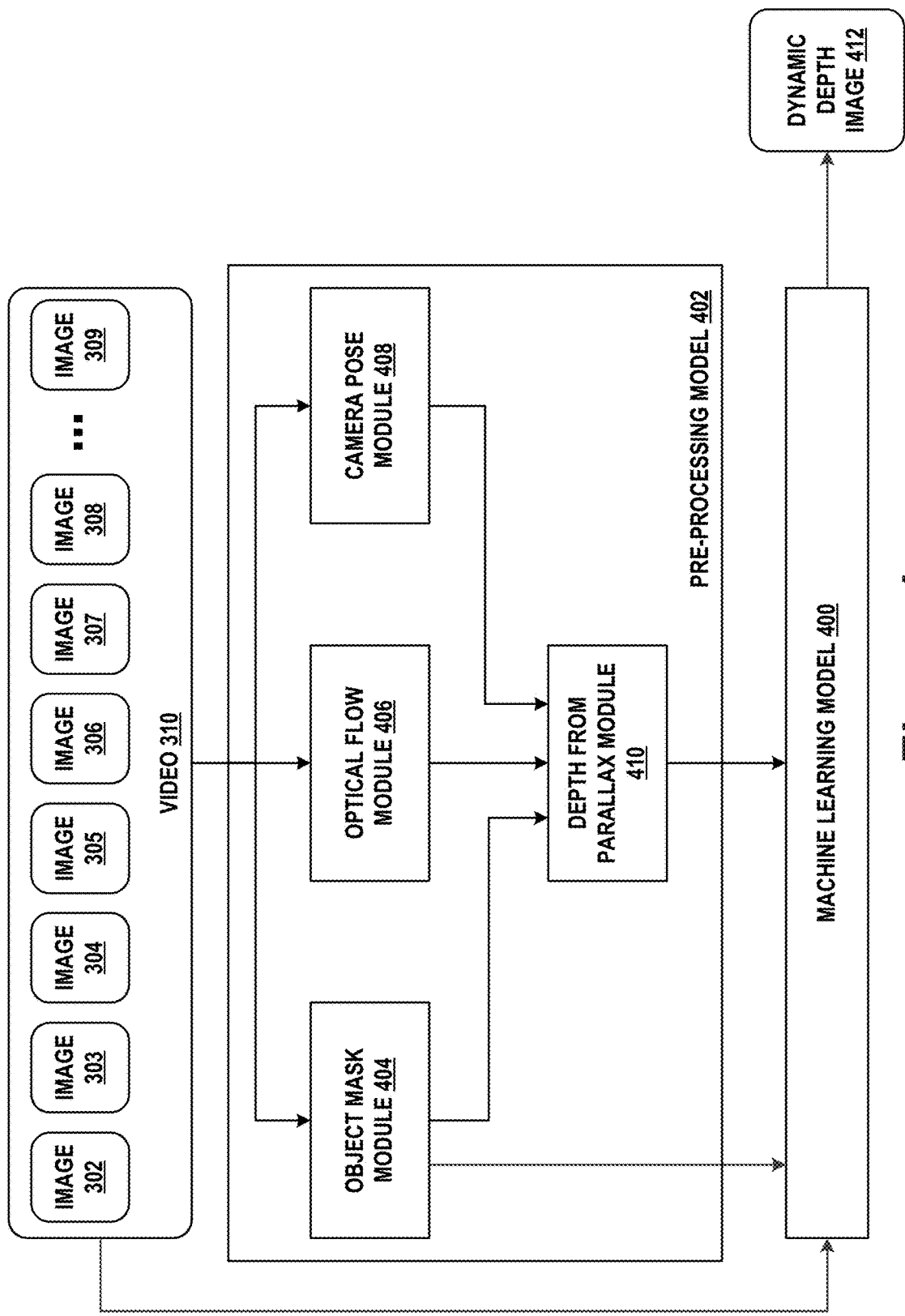

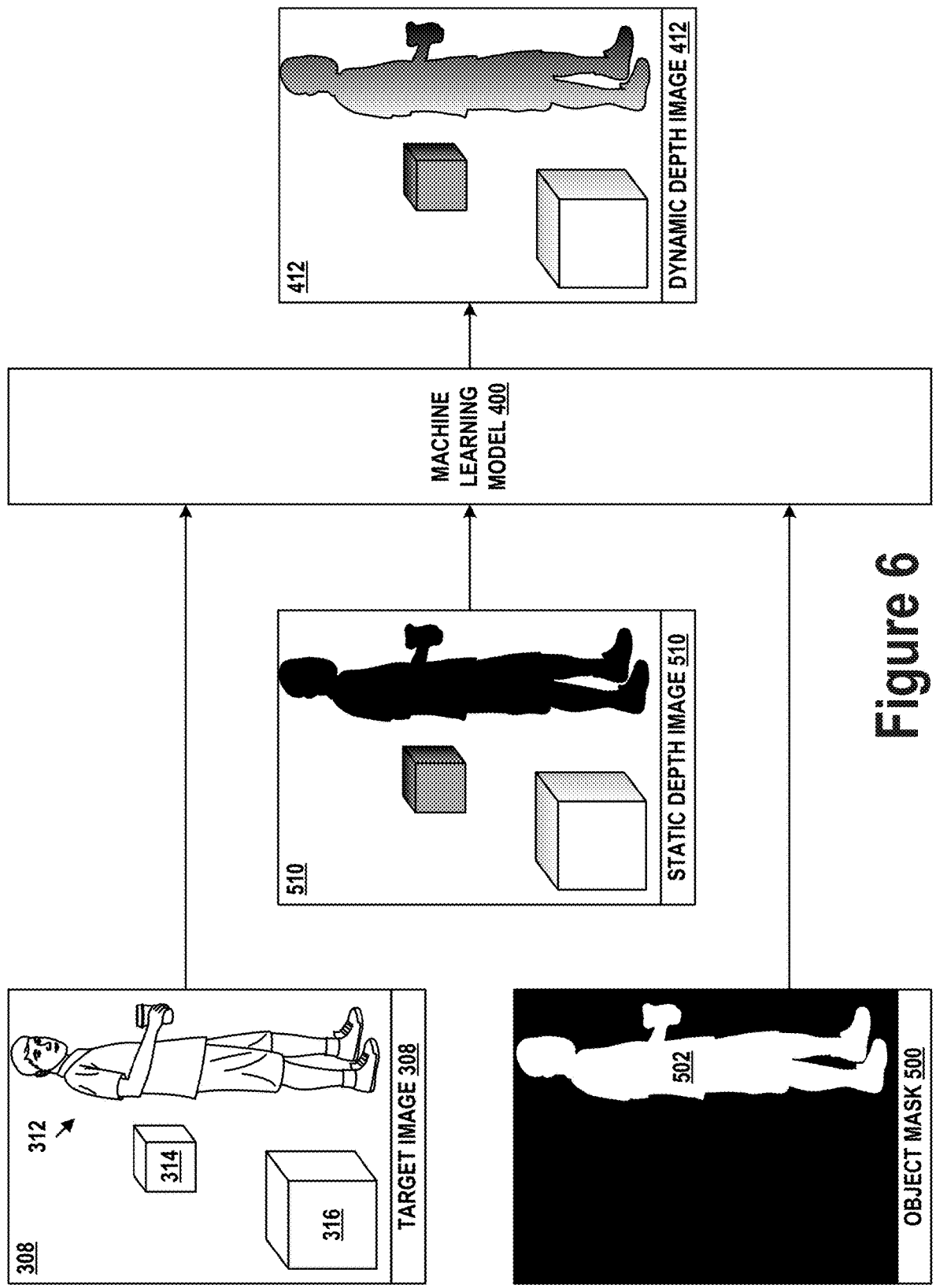

DEPTH DETERMINATION FOR IMAGES CAPTURED WITH A MOVING CAMERA AND REPRESENTING MOVING FEATURES

BACKGROUND

Depth values of features in a three-dimensional environment may be determined by way of triangulation. Triangulation can involve determining the position of a point in three-dimensional space based on that point's projection onto two or more images. The depth of the point may be determined based on a location of the point's projection in each image and the relative position of the camera(s) when capturing each image. When both images are captured in parallel (e.g., by a stereoscopic camera), the depth of both moving and static features of an environment may be determined. However, when images are captured serially, as in the case of a monoscopic camera, movement of features between successive images can make triangulation difficult to apply. Specifically, for a given point on a moving object, it might be difficult to determine whether the apparent displacement of that point between successive images is due to camera motion or due to movement of the object. Accordingly, determining depth for monoscopic images may be difficult.

SUMMARY

A machine learning (ML) model may be configured to determine depth values for images of a monoscopic video. Since each image may lack explicit depth data, the depth values may be determined by combining the information from (i) a target image for which the depth is to be determined and (ii) a reference image that provides another view of the same scene as the target image. The ML model may be trained to determine the depth values for the target image based on the target image, a static depth image that represents depth values for static features in the target image, and an object mask configured to remove, from the static depth image, moving features represented thereby. The static depth image may be determined based on motion parallax between the reference image and the target image, and may be valid for static features of the target image. The ML model may be configured to determine the depth values for the target image by (i) refining the depth values of the static features in the static depth image and (ii) filling in depth values for the moving features masked by the object mask.

In a first example embodiment, a method includes obtaining, by a processor, a reference image and a target image each representing an environment containing moving features and static features. The reference image has been captured by a camera at a first time and the target image has been captured by the camera at a second time later than the first time. The method also includes determining, by the processor, an object mask configured to (i) mask out the moving features in the target image and (ii) preserve the static features in the target image. The method additionally includes determining, by the processor and based on motion parallax between the reference image and the target image, a static depth image that represents depth values of the static features in the target image. The method further includes generating, by the processor and by way of an ML model, a dynamic depth image that represents depth values of both the static features and the moving features in the target image. The ML model is trained to generate the dynamic depth image by determining depth values of at least the moving features based on (i) the target image, (ii) the object mask, and (iii) the static depth image.

In a second example embodiments, a system is provided that includes a camera configured to generate a reference image and a target image each representing an environment containing moving features and static features. The reference image is generated at a first time, and the target image is generated at a second time later than the first time. The system also includes computing hardware configured to determine an object mask configured to (i) mask out the moving features in the target image and (ii) preserve the static features in the target image. The computing hardware is also configured to determine, based on motion parallax between the reference image and the target image, a static depth image that represents depth values of the static features in the target image. The system further includes an ML model configured to generate a dynamic depth image that represents depth values of both the static features and the moving features in the target image. The ML model is trained to generate the dynamic depth image by determining depth values of at least the moving features based on (i) the target image, (ii) the object mask, and (iii) the static depth image.

In a third example embodiment, a non-transitory computer readable storage medium is provided having stored thereon instructions that, when executed by a computing device, cause the computing device to perform operations. The operations include obtaining a reference image and a target image each representing an environment containing moving features and static features. The reference image has been captured by a camera at a first time and the target image has been captured by the camera at a second time later than the first time. The operations also include determining an object mask configured to (i) mask out the moving features in the target image and (ii) preserve the static features in the target image. The operations additionally include determining, based on motion parallax between the reference image and the target image, a static depth image that represents depth values of the static features in the target image. The operations further include generating, by way of an ML model, a dynamic depth image that represents depth values of both the static features and the moving features in the target image. The ML model is trained to generate the dynamic depth image by determining depth values of at least the moving features based on (i) the target image, (ii) the object mask, and (iii) the static depth image.

In a fourth example embodiment, a system is provided that includes means for obtaining a reference image and a target image each representing an environment containing moving features and static features. The reference image has been captured by a camera at a first time and the target image has been captured by the camera at a second time later than the first time. The system also includes means for determining an object mask configured to (i) mask out the moving features in the target image and (ii) preserve the static features in the target image. The system additionally includes means for determining, based on motion parallax between the reference image and the target image, a static depth image that represents depth values of the static features in the target image. The system further includes means for generating, by way of an ML model, a dynamic depth image that represents depth values of both the static features and the moving features in the target image. The ML model is trained to generate the dynamic depth image by determining depth values of at least the moving features based on (i) the target image, (ii) the object mask, and (iii) the static depth image.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 illustrates a system for determining depth, in accordance with example embodiments.

FIG. 6 illustrates a dynamic depth image, in accordance with example embodiments.

DETAILED DESCRIPTION

Figure 1:
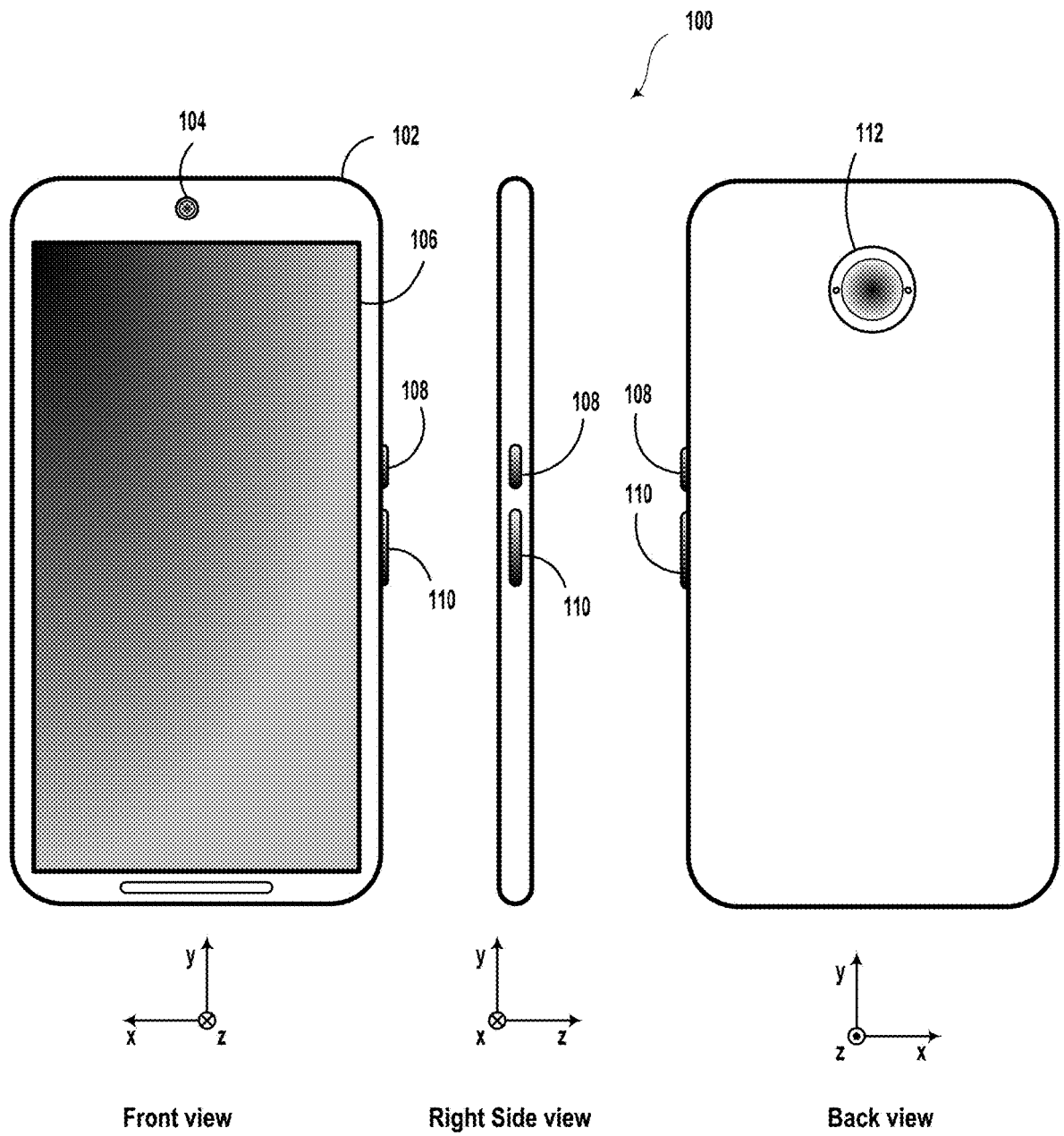
FIG. 1 illustrates a computing system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Image data is often captured using a monoscopic camera. For example, a hand-held device such a phone may be used to capture a video of a scene that includes both moving and static features. Determining the geometry of the scene under such conditions can be a challenging task, as the moving features violate the epipolar constraint on which 3D vision relies. Thus, such moving features are often treated as noise or outliers by conventional structure from motion (SfM) and multi view stereo (MVS) methods of determining scene geometry.

Human depth perception, however, is capable of generating an approximation of the scene geometry even when both the human observer and the features within the scene are moving. Further, human depth perception is capable of generating such an approximation when the scene is observed with just one eye, and stereoscopic images are thus unavailable. Accordingly, the systems and operations disclosed herein approximate this ability of human depth perception by combining SfM and MVS methods with trained ML models. Specifically, these systems and operations are configured to generate depth maps from monoscopic images of a video containing both moving and static features, where the video is captured using a moving monoscopic camera.

Specifically, the system for determining depth of monoscopic images may include a pre-processing model and an ML model. The pre-processing model may be configured to process the monoscopic images to generate inputs for the ML model. Namely, the pre-processing model may be configured to, based on a target image and a reference image from the monoscopic video, generate one or more of (i) an object mask, (ii) an optical flow image, (iii) a camera pose, (iv) a static depth image, (v) a confidence map, or (vi) moving feature keypoints (e.g., human keypoints). Thus, the ML model may be trained to, based on the target image and one or more of these outputs of the pre-processing model, determine a dynamic depth image representing depth values for the target image.

Each output of the pre-processing model may, individually or in combination with the other outputs, provide information indicative of depth values of at least some portions of the target image. For example, the static depth image may indicate the depth of static features within the target image, thus providing to the ML model an initial depth estimate. The static depth image may be determined based on the optical flow image and the camera pose, which collectively allow for estimation of depth based on motion parallax.

The object mask may be used to mask out the moving features within the static depth image, since the depth values for these features may be inaccurate. The moving features, due to the fact that they may change their position within the environment between the reference and target frames, might not satisfy the assumptions of the motion parallax models. Thus, removing these features from the static depth image allows the ML model to ignore the potentially-erroneous depth values. Similarly, the confidence map may indicate, for each pixel of the static depth image, a confidence value associated with the determined depth value. Thus, the ML model may rely more strongly on high-confidence depth values in the static depth image and may ignore or rely less on low-confidence depth values.

Further, moving feature keypoints may define a frame, skeleton, shell, or other structural approximation of the moving features. For example, when the moving features are humans, the keypoints may take the form of a skeleton that includes nodes connected by edges that approximate the orientation of the human represented in the image. For example, nodes may be placed at one or more joints of the human represented in the image, and edges may run along one or more limbs of the human, thus approximating the human shape and conformation. Analogous skeletons may be fitted when the moving features are animals or vehicles, thus providing an indication of the conformation of the components (which imposes some depth constraints) of the moving feature represented in the image.

The ML model may be trained to use one or more of the above inputs to determine the depth values of features in the target image. For example, the ML model may be configured to (i) determine and/or refine the depth values of the static features (e.g., represented in the static depth image) and (ii) fill in or inpaint depth values for the moving features. Thus, the dynamic depth image may represent depth values for all features, both moving and static, in the target image. In some implementations, the dynamic depth image may be a dense depth image that provides a depth values for each pixel in the target image.

The ML model may be trained to generate such dynamic depth images using a training video set that includes both (i) static features and (ii) moveable features that are fixed in predetermined poses while they appear in the video. In one example, such a training video set may include humans "frozen" in fixed poses while a monoscopic camera moves through the environment to capture the video. Such a training video set may be useful in training the ML model because the entire scene remains fixed while the camera moves with respect thereto. Accordingly, SfM and MVS methods may be applied to such videos to generate supervised depth images that represent or at least approximate a ground-truth depth of these scenes. Notably, the supervised depth images may represent depth values for both the static and the movable features.

The ML model may be trained by comparing the dynamic depth image generated for a particular target image within the training video set to the corresponding supervised depth image. Based on the difference between the corresponding depth values in these two images, the parameters of the ML model may be adjusted to iteratively improve the accuracy of the ML model. Thus, an ML model may be generated that accurately determines the depth values of both static and moving features in videos.

The dynamic depth images generated by the ML model may be used to apply a plurality of depth-based visual effects to the video. In one example, features of the target image may be brought into and out of focus. In another example, various objects may be inserted into the target image at different positions within the environment. Based on the object's position within the environment, occlusions between the objects and other features of the image may be determined and rendered to represent the object's position in relation to these other features. Similarly, features may be removed from the target image and portions of the environment revealed by the removal may be inpainted according to the depth and the visual content of neighboring image frames.

In a further example, the perspective from which the target image is viewed may be modified. Portions of the environment that become visible due to the modified perspective may be inpainted according to the depth and the visual content of neighboring image frames. In a yet further example, the dynamic depth images of the monoscopic video may be used to generate a stereoscopic version of the video.

II. Example Computing Devices

FIG. 1 illustrates an example form factor of computing system 100. Computing system 100 may be, for example, a mobile phone, a tablet computer, or a wearable computing device. However, other embodiments are possible. Computing system 100 may include various elements, such as body 102, display 106, and buttons 108 and 110. Computing system 100 may further include front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing camera 112 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some embodiments, display 106 may display a digital representation of the current image being captured by front-facing camera 104 and/or rear-facing camera 112, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, one or more of front-facing camera 104 or rear-facing camera 112 may be an array of one or more cameras.

Either or both of front facing camera 104 and rear-facing camera 112 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Computing system 100 may also include an ambient light sensor that may continuously or from time to time determine the ambient brightness of a scene (e.g., in terms of visible and/or infrared light) that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing system 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device equipped with at least some audio capture and/or audio processing capabilities. It should be understood that computing device 200 may represent a physical audio processing system, a particular physical hardware platform on which an audio sensing and processing application operates in software, or other combinations of hardware and software that are configured to carry out audio capture, processing, and/or diarization functions.

Figure 2:
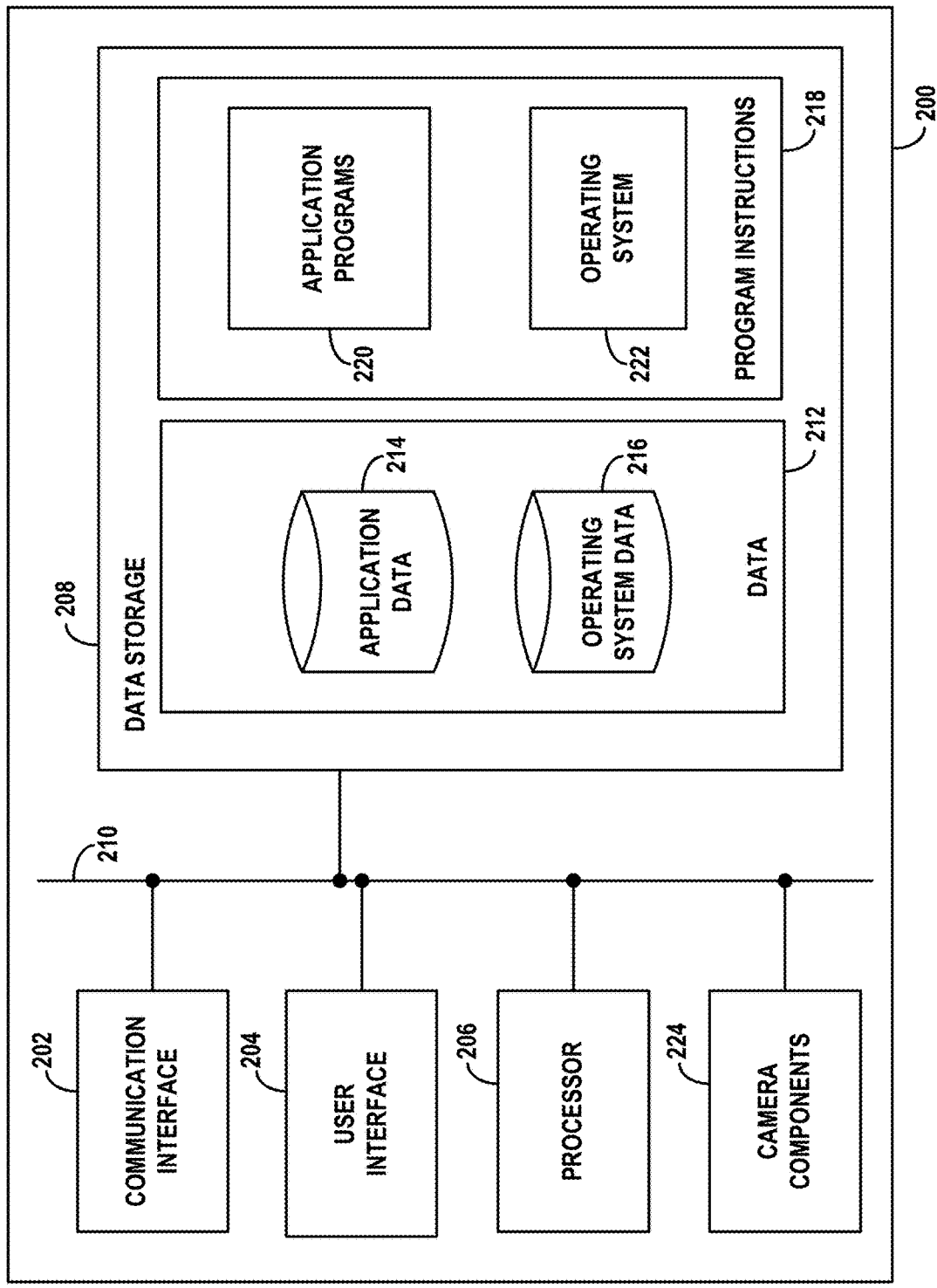
FIG. 2 illustrates a computing device, in accordance with example embodiments.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some embodiments, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Video Stream from Monoscopic Camera

Figure 3:
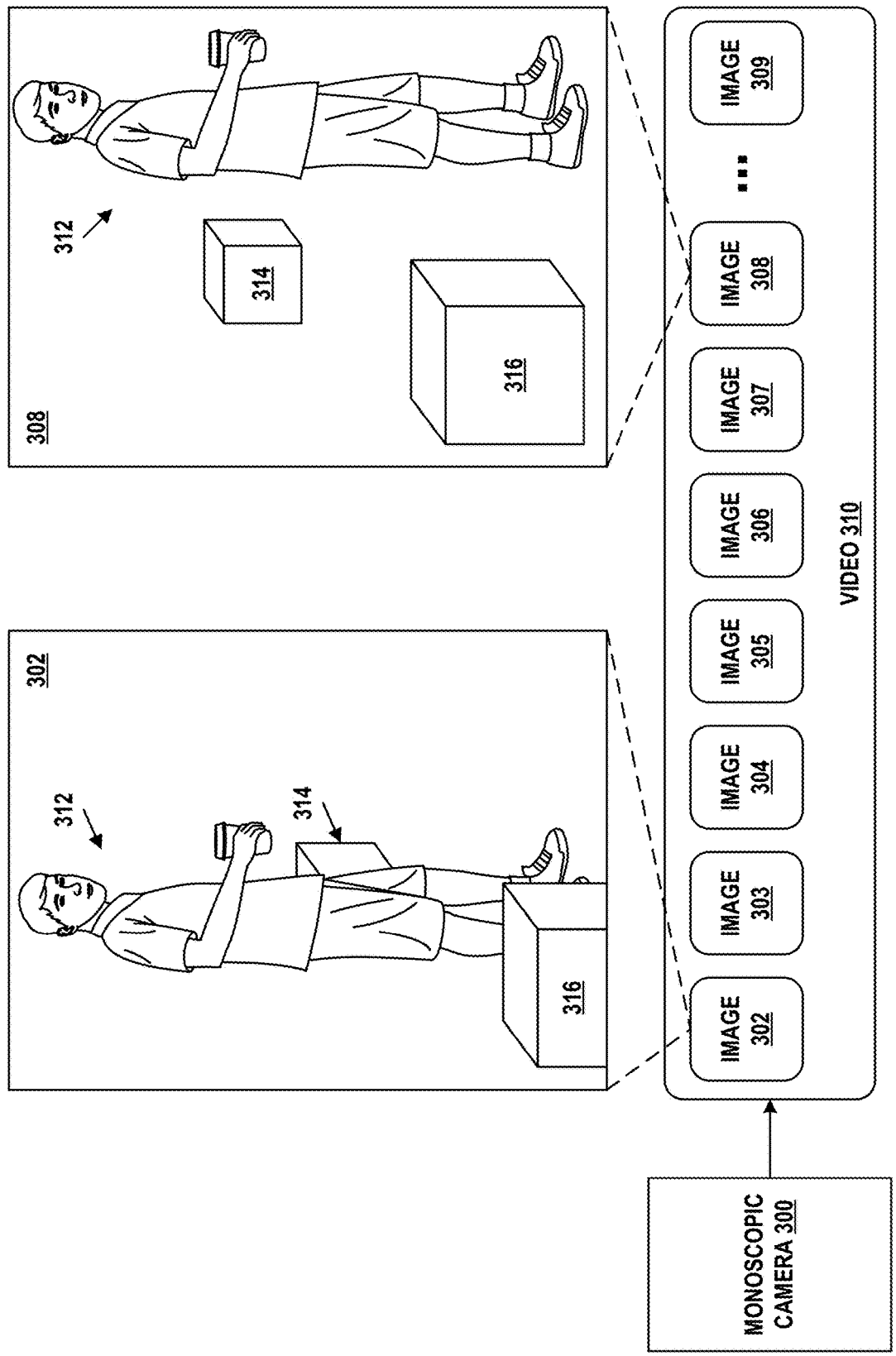
FIG. 3 illustrates a video, in accordance with example embodiments.

FIG. 3 illustrates an example video that may be processed by the systems and operations herein disclosed to determine depth values of features represented within the video. Namely, FIG. 3 illustrates video 310 generated by a monoscopic camera 300. Video 310 includes images 302, 303, 304, 305, 306, 307, and 308-309 (i.e., images 302-309), which may alternatively be referred to as frames or image frames of the video. Images 302-309 may represent static features of an environment (e.g., boxes 314 and 316) and moving features of the environment (e.g., human 312). Static features may include objects and other physical features that are expected to remain stationary for a predetermined period of time, such as building structures, trees, roads, or sidewalks, among other possibilities. Moving features may include objects and other physical features that are expected to move within the predetermined period of time, such as humans, animals, or vehicles, among other possibilities. Thus, some moving features change their positions during video 310, while static features may remain in fixed positions during video 310.

Video 310 may be captured by monoscopic camera 300 as monoscopic camera 300 moves through the environment. That is, both monoscopic camera 300 and some features within the environment may be moving as video 310 is captured. Monoscopic camera 300 may include an image capture device configured to capture one image at a time from a given perspective. Thus, monoscopic camera might not be configured to explicitly determine depth values of features represented in video 310. Thus, images 302-309 may represent red-green-blue (RGB) image data or grayscale image data, but might not explicitly include any depth values. Monoscopic camera 300 may be contrasted with a stereoscopic camera, a structured light camera, a time-of-flight camera, or another image-based depth sensor configured to generate depth images that explicitly represent the depth values associated with various features within the environment.

Although none of images 302-309, taken alone, explicitly indicate the depth of the features represented therein, by using the systems and operations herein disclosed, depth values for the various features represented by images 302-309 may be determined based on a combination of two or more such images. Specifically, depth values may be determined for each of human 312, box 314, and box 316 based on image 302, which may be referred to as a reference image, and image 308, which may be referred to as a target image. The determined depth values may represent, for example, the distance between monoscopic camera 300 and the corresponding features at the time target image 308 was captured. That is, the systems and operations herein discussed may be configured to determine the depth values associated with a plurality of pixels of target image 308.

IV. Example System for Determining Depth

FIG. 4 illustrates a system for determining the depth values of features represented in a monoscopic video or a plurality of successive monoscopic images. Specifically, the system includes pre-processing model 402 and ML model 400, each of which may be implemented as purpose-built hardware, software executable on general-purpose hardware (e.g., computing system 100 or 200), or a combination thereof. Pre-processing model 402 may be configured to process two or more images of video 310 to generate inputs that ML model 400 may be configured to use to generate dynamic depth image 412. Dynamic depth image 412 may include depth values for both the static features and the moving features represented in the frames of video 310. In order to provide an illustrative example, the depth determination operations are herein discussed with respect to target image 308. However, the same or similar operations may be performed for each image of video 310 to determine the depth values of the features represented therein.

Pre-processing model 402 includes object mask module 404, optical flow module 406, camera pose module 408, and depth from parallax module 410. Object mask module 404 may be configured to generate an object mask for the moving features within the target image, and is discussed in more detail with respect to FIG. 5A. Optical flow module 406 may be configured to generate an optical flow image representing the optical flow between the reference image and the target image, and is discussed in more detail with respect to FIG. 5B. Camera pose module 408 may be configured to determine the camera pose associated with the target image, and is discussed in more detail with respect to FIG. 5C.

The optical flow image may depend on (i) the depth of features represented in the target image and (ii) the relative pose of the camera between capturing the reference image and the target image. Thus, depth from parallax module 410 may be configured to determine a parallax depth image based on the optical flow image and the relative camera pose by removing from the optical flow image the flow component attributable to the camera pose. Depth from parallax module 410 is discussed in more detail with respect to FIG. 5D. The parallax depth image may be generated with the assumption that features within the image are not moving. Thus, the parallax depth image may accurately represent the depth of the static features within the target image, but not of the moving features. The parallax depth image may be masked with the object mask to remove therefrom the inaccurate depth values of moving features, thereby generating a static depth image. Thus, the static depth image may represent (i) the depth values of static regions and (ii) undefined or unknown depth values for the moving regions.

The target image, the object mask, and the static depth image may be provided as inputs to ML model 400, which may be trained to generate dynamic depth image 412 on the basis of these inputs. Dynamic depth image 412 may represent depth values of both the static features and the moving features within the target image. ML model 400 may generate dynamic depth image 412 by (i) refining the depth values of the static regions represented by the static depth image and (ii) filling in or inpainting the depth values of the moving regions that are masked-out in the static depth image. Thus, dynamic depth image 412 may represent depth values over the entirety of the target image. In some implementations, dynamic depth image 412 may be a dense depth image that indicates a depth value for each pixel therein. In other implementations, dynamic depth image 412 may be a sparse depth image that indicates depth values for only some pixels.

V. Example Pre-Processing Model Components and Operations

Figure 5A:
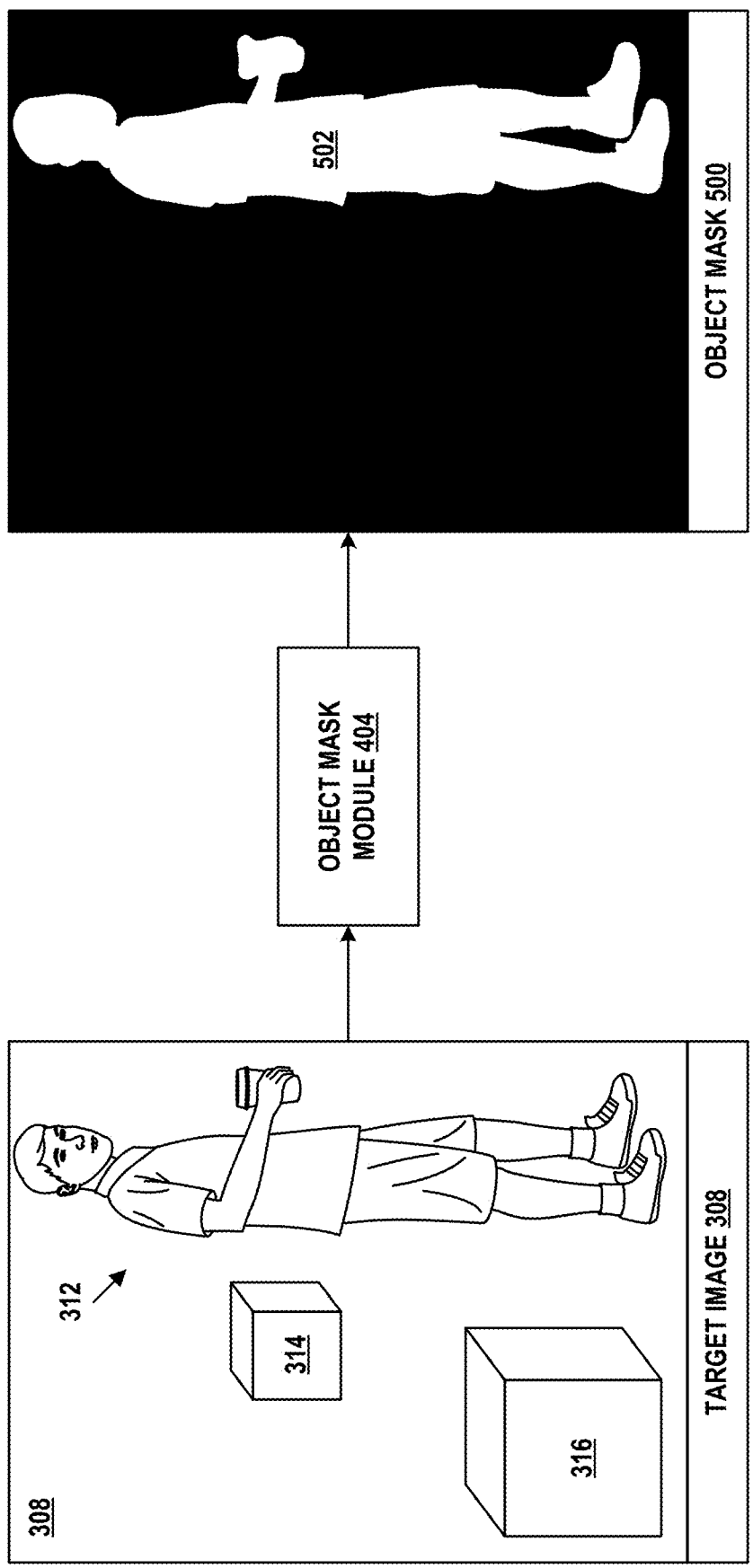
FIG. 5A illustrates an object mask, in accordance with example embodiments.

FIG. 5A illustrates an object mask 500 determined by object mask module 404. Object mask 500 may be a binary image that assigns a first value to static features in target image 308 and a second value to moving features within target image 308. Thus, region 502 corresponding to human 312 (a human expected to be moving) is shown in white, while all other regions, including boxes 314 and 316, of object mask 500 are shown in black. Thus, when target image 308 (or a depth image generated based thereon) is masked with object mask 500 (e.g., when a bitwise AND operation is applied to pixels of target image 308 and corresponding pixels of object mask 500), moving features will be removed from target image 308 and static features will be preserved. Accordingly, object mask 500 identifies to ML model 400 the static features and the moving features within target image 308 and the static depth image.

Object mask module 404 may implement one or more object instance segmentation algorithms configured to generate object masks. In some implementations, each type of moving feature may be associated with a corresponding object instance segmentation algorithm. For example, object mask module 404 may include a human instance segmentation algorithm, an animal instance segmentation algorithm, and/or a vehicle instance segmentation algorithm, among others. In other implementations, object mask module 404 may instead implement a single object instance segmentation algorithm that is generalized to multiple types of moving features.

The object instance segmentation algorithm may be configured to determine outlines of instances of the moving features (e.g., determine an outline of human 312 within target image 308). The object instance segmentation algorithm may also be configured to fill in or inpaint the outlines to generate solid mask regions (e.g., fill in the outline of human 312 to generate solid region 502). The object instance segmentation algorithm may be implemented as a rule-based image processing algorithm, as a machine learning model (e.g., an artificial neural network), or a combination of these approaches.

Figure 5B:
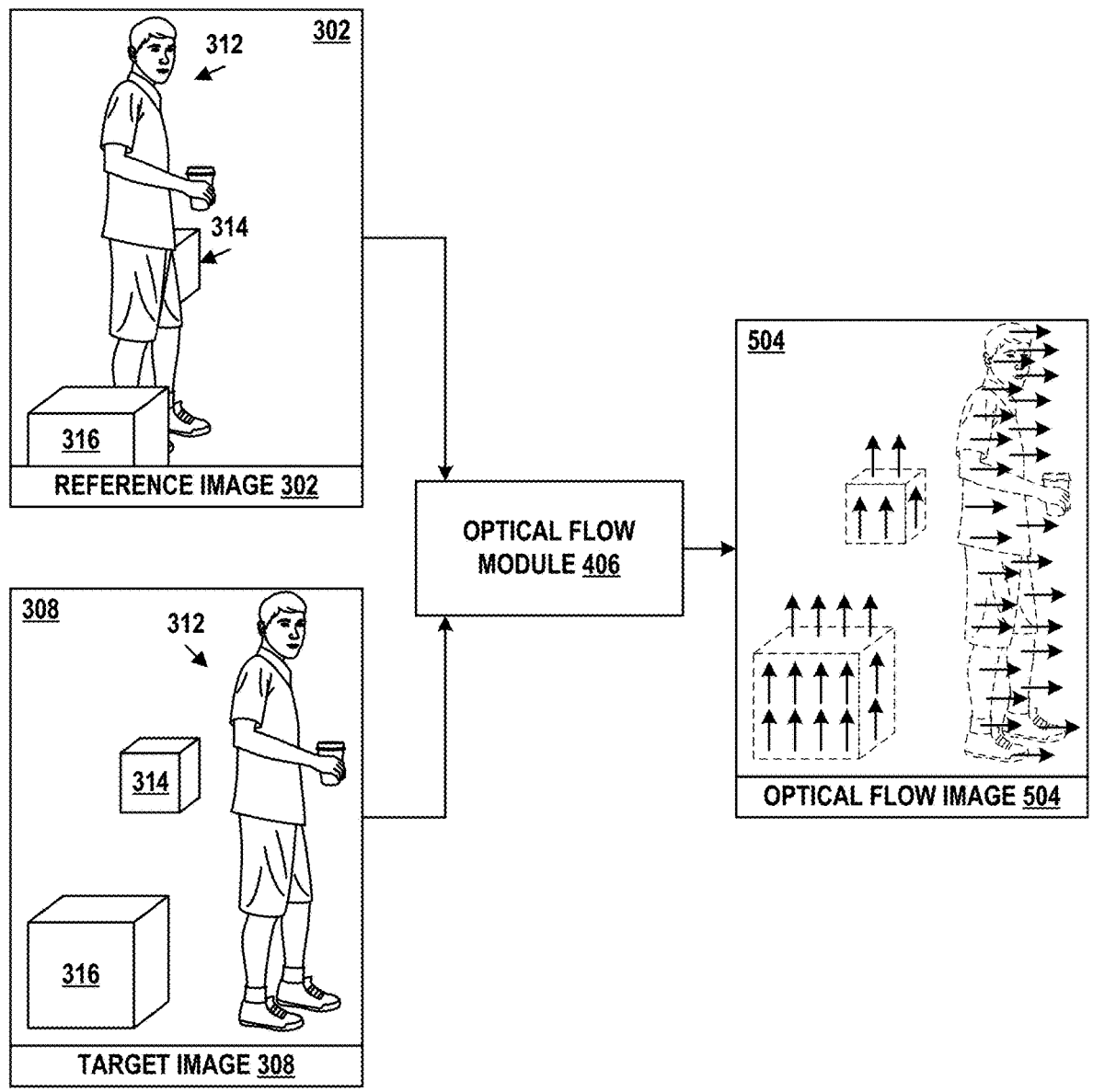
FIG. 5B illustrates an optical flow image, in accordance with example embodiments.

FIG. 5B illustrates an optical flow image 504 determined by optical flow module 406. Optical flow image 504 represents the apparent motion of the brightness pattern between reference image 302 and target image 308. Thus, optical flow image 504 includes arrows pointing up to indicate that the pixels representing boxes 314 and 316 appear to move upwards between reference image 302 and target image 308, and arrows pointing to the right to indicate that the pixels representing actor 312 appear to move rightward between reference image 302 and target image 308. The apparent motion may be caused by movements of the camera and/or movements of the features between these images. For static features, the extent of the apparent motion depends on (i) the depth of features represented in the target image (i.e., nearby features appear to move more than features far away from the camera) and (ii) the relative pose of the camera between capturing the reference image and the target image (i.e., larger camera movements cause more apparent motion).

Thus, optical flow image 504 provides a basis for determining the static depth image using motion parallax between target image 308 and reference image 302. Specifically, if the relative pose of the camera is accounted for, optical flow image 504 may be used to determine the depth of static features. In the case of static features, when the effect of camera pose on the optical flow field is removed, the optical flow field represented in image 504 is attributable to the depths of the static features, thus allowing for determination of these depths.

Optical flow module 406 may implement one or more rule-based algorithms, learning-based models, or combinations thereof to determine the optical flow field between two images. For example, optical flow module 406 may implement, or may be based on, the Lucas-Kanade algorithm, the Gunnar-Farneback algorithm using polynomial expansion, and/or the Horn-Schunck method, among other possible rule-based approaches. In another example, optical flow module 406 may implement, or may be based on, learning-based approaches such as, for example, FlowNet or FlowNet 2.0, among others.

Figure 5C:
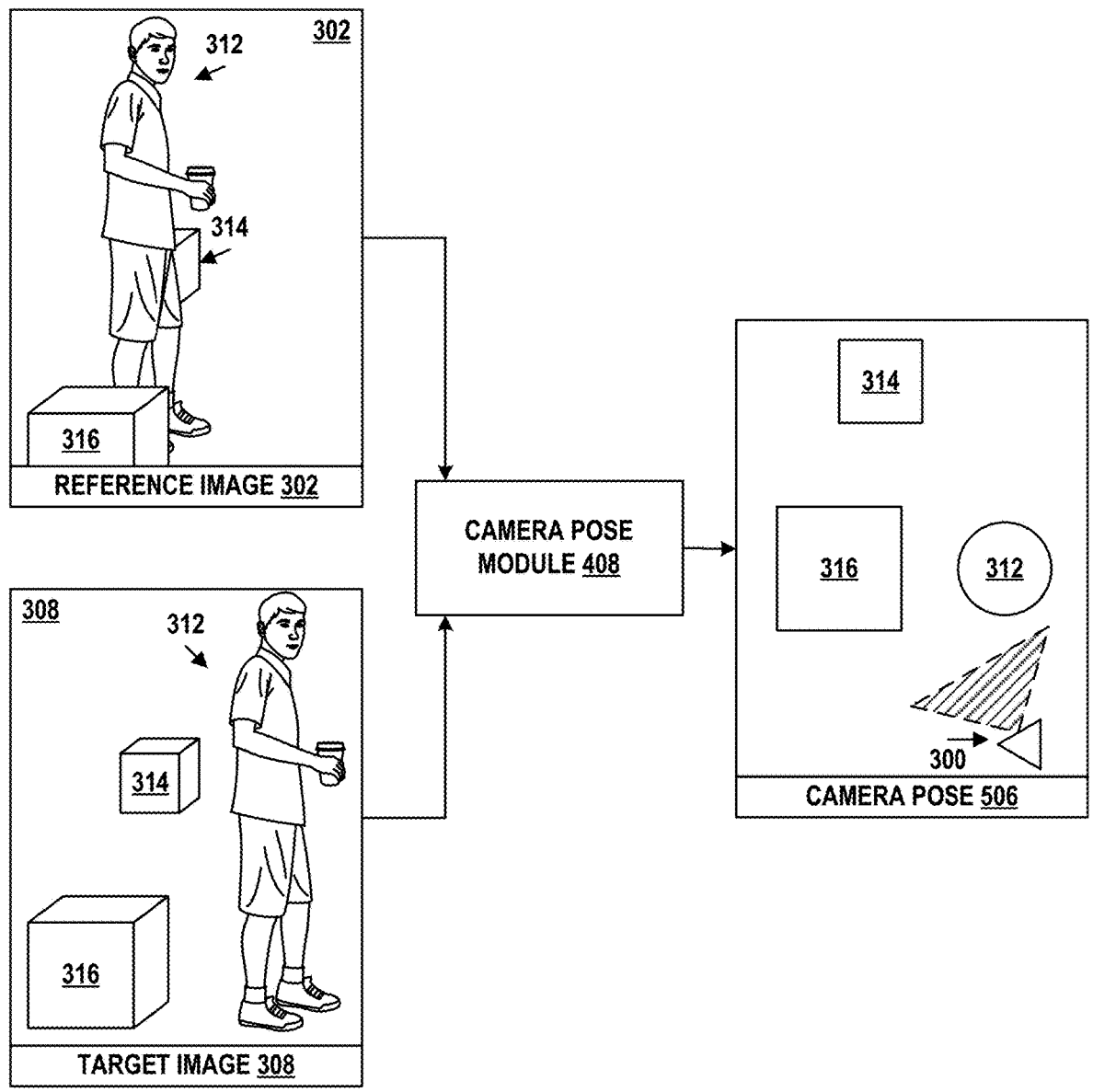
FIG. 5C illustrates a camera pose, in accordance with example embodiments.

FIG. 5C illustrates a camera pose 506 determined by camera pose module 408. Camera pose 506 illustrates a top-down view of a relative pose of camera 300 between reference image 302 and target image 308. In one example, relative pose 506 may be mathematically expressed as a translation and a rotation of camera 300 when capturing target image 308 relative to a reference frame defined when capturing reference image 302.

To that end, camera pose module 408 may implement a visual-inertial odometry algorithm configured to determine camera pose 506 based on the apparent motion between images 302 and 308. The visual-inertial odometry algorithm may involve selecting points of interest (e.g., corners) present in pairs of reference and target images, determining essential matrices for such pairs of images, decomposing the essential matrices to obtain relative poses between the pairs of images, and performing bundle adjustment, among other operations. In other implementations, camera pose module 408 may additionally or alternatively determine camera pose 506 using learning-based approaches. For example, camera pose module 408 may include a trained ML model configured to determine camera poses based on pairs of successive images.

Figure 5D:
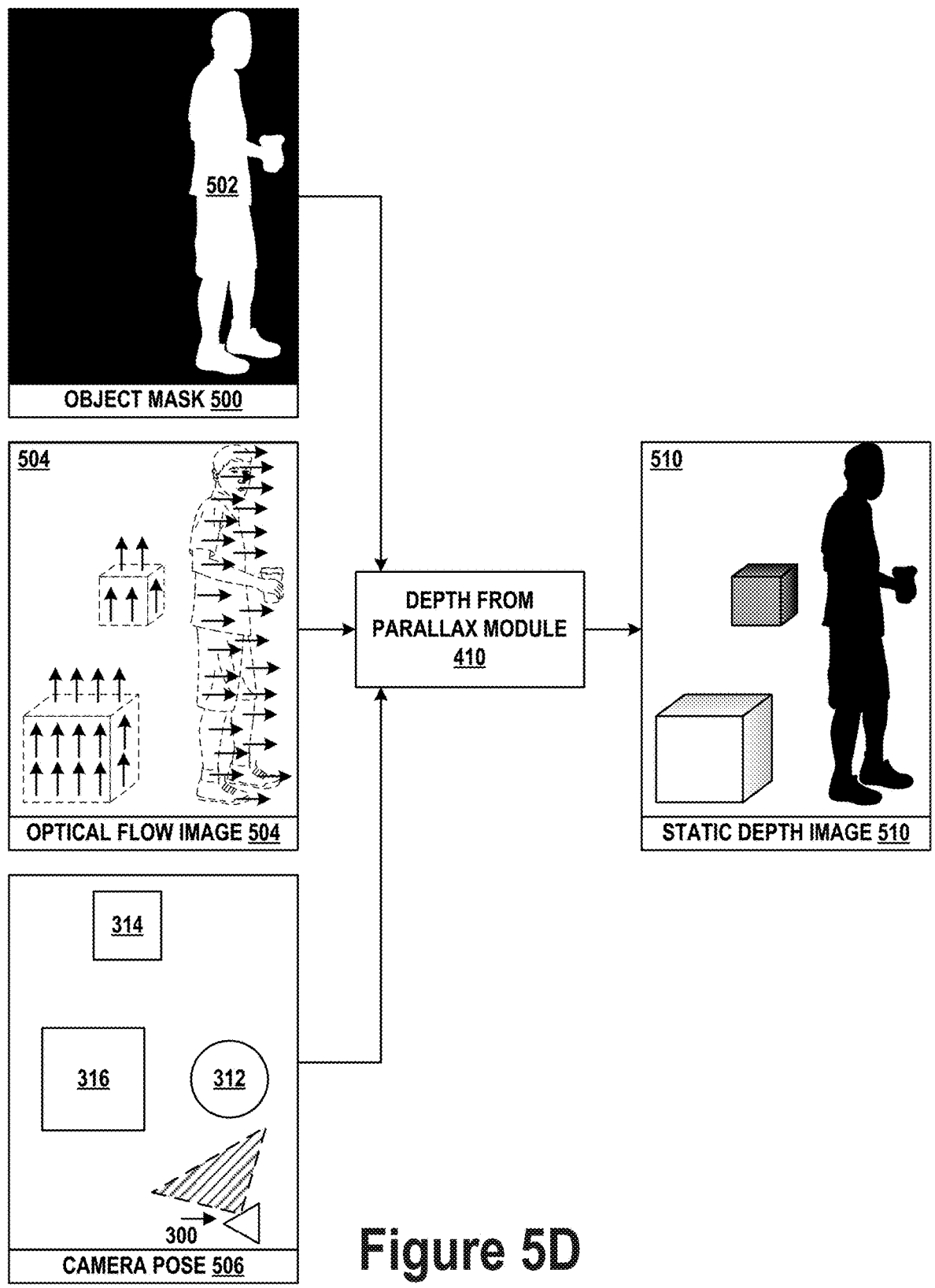
FIG. 5D illustrates a static depth image, in accordance with example embodiments.

FIG. 5D illustrates a static depth image 510 determined by depth from parallax module 410 based on object mask 500, optical flow image 504, and camera pose 506. Static depth image 510 represents (i) depth values for static features of target image 308 and (ii) moving features that are masked out according to object mask 500. The masked out moving features may be indicated in static depth image using a reserved value that is not otherwise used to indicate a valid depth (e.g., the maximum value representable by pixels of the image). Depth from parallax module 410 may be configured to determine the depth values for static features of target image 308. As noted above, the optical flow field of image 504 may be caused by movements of the camera and/or movements of the features between reference and target images. For moving features, it might not be possible to determine the component of the flow field due to camera motion and feature motion. For static features, however, the entire flow field is caused by camera motion since these features remain fixed in the environment across image frames.

Further, for static features, the magnitude of optical flow field of image 504 depends on (i) the depth of the static features represented in the target image and (ii) the relative pose of the camera between capturing the reference image and the target image. Thus, with camera pose 506 having been determined, depth from parallax module 410 may be configured to remove the effect of this camera pose from optical flow image 504 and determine the depth values for the static features. To that end, depth from parallax module 410 may implement a Plane-Plus-Parallax decomposition based on optical flow image 504 and camera pose 506 to determine a parallax depth image. The parallax depth image may be masked with object mask 500 to determine static depth image 510.

In some cases, depth from motion parallax may be inaccurate, such as when the displacement between two views (as represented by the captured images) is small or is well-approximated by a homography (e.g., in the case of pure camera rotation). Such cases may be reduced or avoided by selecting the reference and target images such that the two views have significant overlap and sufficient baseline. Formally, pre-processing model 402 may be configured to select, for each reference image $I^r$, the index s of $I^s$ according to $s = \mathrm{argmax}_j (d^{rj} o^{rj})$. The term $d^{rj}$ may represent the $L_2$ distance between the camera centers of $I^r$ and its neighboring frame $I^j$. The term $o^{rj}$ may represent the fraction of co-visible SfM features in $I^r$ and $I^j$, and may be expressed as $$o^{rj} = \frac{2|V^r \cap V^j|}{|V^r| + |V^j|},$$

where $V^r$ and $V^j$ are the sets of features visible in $I^r$ and $I^j$, respectively. Pairs of images for which $o^{rj}$ is less than a threshold (e.g., 0.6), indicating that the fraction of co-visible features is less than the threshold, may be discarded. Further, in some implementations, the maximum interval between s and r may be limited to a maximum value (e.g., 8, 10, 15, etc.) since, as the images in the video move further apart, they are less likely to represent the same scene.

VI. Example Depth Determination by ML Model

FIG. 6 illustrates ML model 400 that is trained to determine dynamic depth image 412 based on target image 308, object mask 500, and static depth image 510. ML model 400 may be, for example, an artificial neural network. Notably, whereas static depth image 510 only includes the depth values for static features of target image 308, dynamic depth image 412 includes depth values for both the static features and the moving features. Thus, dynamic depth image 412 indicates a plurality of depth values for human 312, inpainted by ML model 400, in addition to the depth values for boxes 314 and 316. Additionally, the depth values represented in static depth image 510 may be refined by ML model 400 to more accurately indicate the depths of the static features. Dynamic depth image 412 may also indicate the depth of other portions of target image 308 (e.g., the surface on which human 312 is standing), although this is omitted from the illustration for clarity.

In some implementations, ML model 400 may additionally be trained to receive as input a confidence map that indicates, for each respective pixel in static depth image 510, the accuracy of the depth value associated with the respective pixel. The confidence map may allow ML model 400 to rely more on the depth values in high-confidence regions of static depth image 510, and potentially use these depth values to improve the depth determination in any low-confidence regions. Notably, the confidence map may assist with mitigating the effects of motion blur, shadows, low lighting, and reflections on depth determination for the static features. Such artifacts may result in optical flow image 504 being noisy, and thus compounding uncertainties in static depth image 510. For example, when the camera motion between the reference and target images is a forward/backward motion, resulting in the epipole being located within the target image, the depth values may be inaccurate in some regions of static depth image 510. Accordingly, such depth values may be filtered out.

The confidence value $C(p)$ at each pixel p in the static feature regions of static depth image 510 may be defined as $C(p) = C_{lr}(p) C_{ep}(p) C_{pa}(p)$. The term $C_{lr}(p)$ may measure "left-right" consistency between the forward optical flow field (e.g., from reference image 302 to target image 308) and the backward optical flow field (e.g., from target image 308 to reference image 302), and may be defined as $C_{lr}(p) = \max(0, 1 - r(p)^2)$, where $r(p)$ represents the forward-backward warping error. Specifically, when the forward optical flow field is identical to the backward optical flow field, $C_{lr}(p) = 1$, whereas $C_{lr}(p) = 0$ when the warping error is greater than one pixel.

The term $C_{ep}(p)$ may measure how well the optical flow field complies with the epipolar constraint between the reference image and the target image. Namely, $C_{ep}(p) = \max(0, 1 - (\Gamma(p)/\gamma')^2)$, where $\gamma(p)$ is the distance between the warped pixel position of p based on its optical flow and its corresponding epipolar line, while $\gamma'$ controls the epipolar distance tolerance (e.g., $\gamma'$ may be set to two pixels). The term $C_{pa}(p)$ may quantify an extent of parallax for pixel p between the reference and target images. That is, $$C_{pa}(p) = 1 - \left( \frac{\min(\beta', \beta(p)) - \beta'}{\beta'} \right)^2,$$

where $\beta(p)$ is the angle between the camera rays meeting at pixel p, and where $\beta'$ is the angle tolerance (e.g., 1 degree).

In some implementations, the confidence map may be provided as an additional input to ML model 400, which may in turn be configured to use the information therein to determine a dynamic depth image that is more accurate than it otherwise would be in the absence of such a confidence map. In other implementations, static depth image 510 may, additionally or alternatively, be explicitly modified based on the confidence map before static depth image 510 is provided as input to ML model 400. For example, regions of static depth image 510 associated with confidence values that are less than a threshold value (e.g., less than 0.25) may be masked out, much like the moving features. Thus, in such implementations, ML model 400 might not be able to consider such inaccurate depth values when generating dynamic depth image 412.

In some implementations, ML model 400 may be trained to utilize yet further inputs. For example, ML model 400 may be trained to receive as input, and determine depth values based on, moving feature keypoints. When the moving objects are human, for example, the keypoints may define a skeleton fitted to approximate the arrangement of limbs of a human represented by the target image 308. Thus, such human keypoints may provide information regarding possible depth values along different portions of the skeleton (e.g., because the human body is subject to certain physical constraints).

In other implementations, the number of inputs to ML model 400 may be reduced. For example, ML model 400 may be configured to determine dynamic depth image 412 (i) using only target image 308 or (ii) using target image 308, optical flow image 504, and object mask 500 (but not static depth image 510). In general, however, providing more inputs that contain information indicative of depth may increase the accuracy of the depth values in dynamic depth image 412.

Notably, when ML model 400 is provided with target image 308, object mask 500, and static depth image 510 as inputs, the resulting depth values in dynamic depth image 412 may be more accurate than when ML model 400 is provided with target image 308, object mask 500, and optical flow image 504 (rather than static depth image 510) as inputs. When ML model 400 is provided with target image 308, object mask 500, and optical flow image 504 as inputs, performance of ML model 400 may be approximately the same as if ML model 400 were provided with only target image 308 as input. Thus, ML model 400 might not be able to implicitly learn the relative camera poses (e.g., camera pose 506) used in extracting depth information from the optical flow images. Thus, training ML model 400 to utilize static depth image 510 (rather than some other intermediate image that does not explicitly indicate depth values) may improve the accuracy with which ML model 400 determines depth values in dynamic depth image 412. Similarly, training ML model 400 to utilize the confidence map allows ML model 400 to utilize different portions of static depth image 510 more intelligently in determining the depth values for dynamic depth image 412.

VII. Example Training of ML Model

Figure 7:
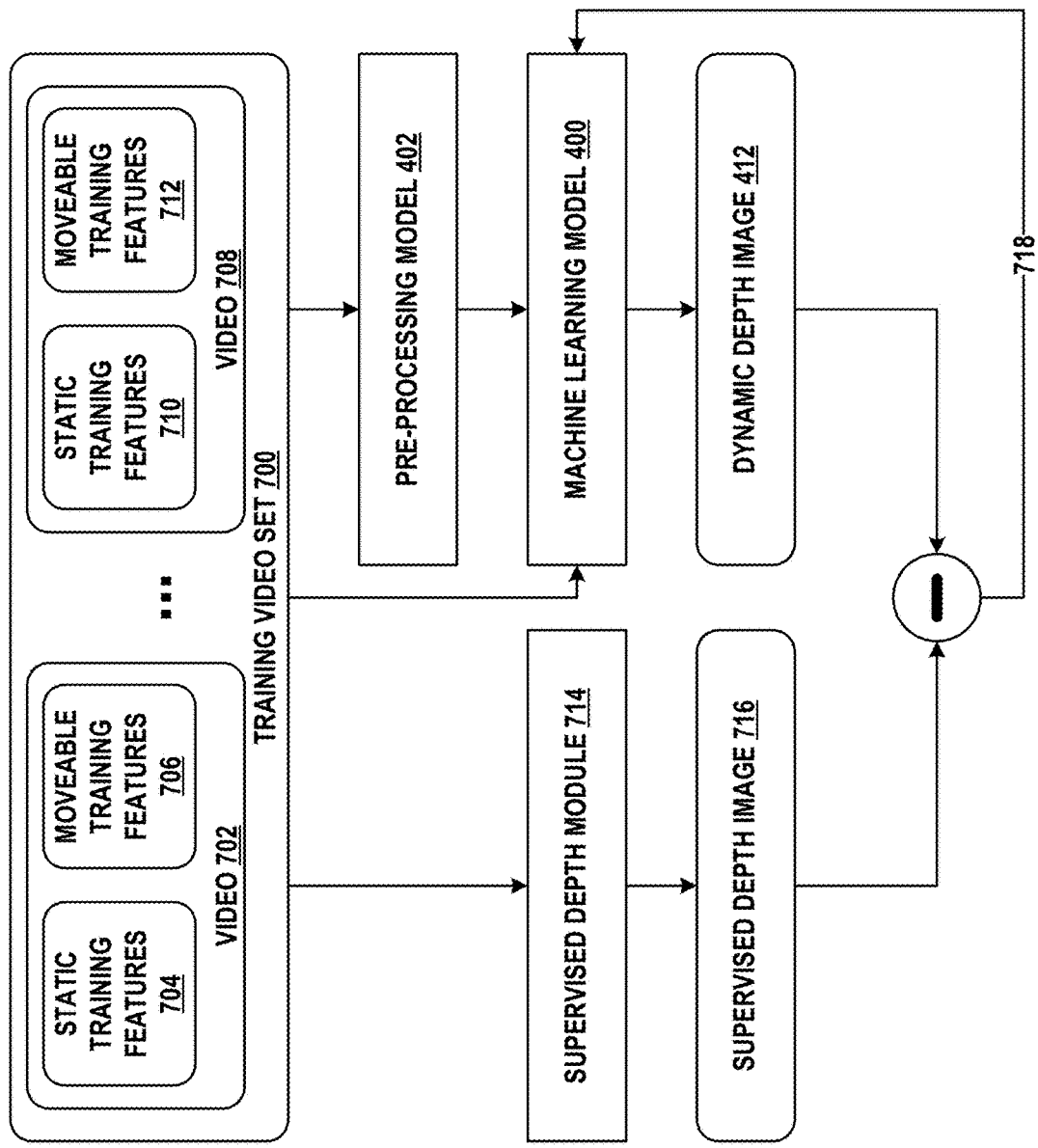
FIG. 7 illustrates training of a machine learning model, in accordance with example embodiments.

FIG. 7 illustrates an example training process for ML model 400. ML model 400 may be trained to determine depth values for monoscopic images using training video set 700, which includes a plurality of training videos 702-708. Each of videos 702-708 includes both (i) static features and (ii) moveable features that are fixed in respective poses while they are visible in the video. Thus, video 702 may include static training features 704 and moveable training features 706 in fixed poses. Similarly, video 708 may include static training features 710 and moveable training features 712 in fixed poses.

Training video set 700 may include, for example, videos in which humans "freeze" in place (e.g., in an interesting pose) while a camera operator moves around the scene filming these humans. To the extent that these humans are able to remain in fixed poses for the duration of the video, such training videos may be processed by SfM and MVS algorithms to determine supervised "ground-truth" depth images. Notably, training video set 700 may include videos of realistic environments and scenes that, unlike synthetic or artificial environments, are useful in training ML model 400 for real-world use cases. Accordingly, these supervised depth images may be used to train ML model 400.

In this example, a supervised depth module 714 may be configured to generate a supervised depth image 716 that represents a "ground-truth" depth of a particular scene represented by videos 702-708. To that end, supervised depth module 714 may be configured to use a visual SfM algorithm to determine camera poses for videos in training video set 700. For example, supervised depth module 714 may be configured to, for a respective video from training video set 700, determine trackable sequences of camera positions, determine an initial camera pose for each image within the respective video, refine the initial camera poses and intrinsic parameters based on the sequences, and perform a global bundle adjustment optimization. In some implementations, sequences with non-smooth camera positions may be removed from consideration.

Supervised depth module 714 may also be configured to, based on the determined camera poses, determine an MVS depth map for each frame of the respective video. In an example implementation, supervised depth module 714 may implement or utilize COLMAP algorithms, among a number of other possible MVS techniques, to determine such MVS depth maps. The final supervised depth image 716 may be generated by filtering the MVS depth maps for outliers and inconsistencies resulting from, for example, camera motion blur, shadows, and reflections present in training video set 700.

In one example, erroneous depth values may be filtered out of the MVS depth maps by considering the consistency of the MVS depth values with independently-computed motion parallax depth values. Specifically, for each image in the respective video, a normalized error $\Delta(p)$ may be computed for every valid pixel according to $$\Delta(p) = \frac{|D_{MVS}(p) - D_{pp}(p)|}{D_{MVS} + D_{pp}(p)},$$

where $D_{MVS}$ is the MVS depth map and $D_{pp}$ the depth map computed from two-frame motion parallax (e.g., using the techniques described with respect to FIG. 5D). Notably, when training on a data set that includes movable features in fixed poses (e.g., humans "frozen" in place), depth can be determined using parallax for the static features as well as the moveable features in fixed poses. Depth values for which $\Delta(p)$ is greater than a corresponding threshold value (e.g., 0.2) may be removed from the MVS depth map to generate supervised depth image 716.

Videos of training video set 700 may also be filtered based on additional criteria. For example, image frames in which fewer than a threshold percentage of the pixels have a valid MVS depth (e.g., fewer than 20%) may be removed from the training set (i.e., a valid supervised depth image 716 might not be generated therefor). Additionally, image frames where a radial distortion coefficient exceeds a threshold value (e.g., 0.1), indicating that a fisheye camera was used to capture the video, may be removed. Similarly, image frames where the focal length is below a first threshold (e.g., 0.6) or above a second threshold (e.g., 1.2), a likely indication of inaccurate camera parameters, may also be removed.

Thus, supervised depth module 714 may be used to generate a set of supervised depth images representing a "ground-truth" depth for a variety of scenes. ML model 400 may be trained by generating a set of dynamic depth images on the basis of the same training data (i.e., the variety of scenes in training video set 700). Each dynamic depth image 412 may be compared to the "ground-truth" supervised depth image 716. Based on the difference between depth images 716 and 412, parameters of ML model 400 may be adjusted, as indicated by arrow 718, in order to cause ML model 400 to generate dynamic depth images that more closely match the corresponding supervised depth images. The parameters of ML model 400 may be revised iteratively until a desired level of accuracy is reached. A new version of dynamic depth image 412 may be generated after each revision of the parameters.

Because the depth values computed by supervised depth module and ML model 400 have an arbitrary scale, a scale invariant depth regression loss function may be used to train ML model 400 in some implementations. For example, the loss function may be $L_{SI}=L_{MSE}+\alpha_1 L_{grad}+\alpha_2 L_{sm}$, where $L_{MSE}$ denotes a scale-invariant mean square error (MSE). $L_{MSE}$ may compute a squared, log-space difference in depth between two pixels in dynamic depth image 412 and the same two pixels in supervised depth image 716, and may be averaged over all pairs of pixels. Intuitively, $L_{MSE}$ looks at all pairs of points, and penalizes differences in their ratio of depth values with respect to ground truth.

$L_{grad}$ is a multi-scale gradient term that represents the $L_1$ norm difference between (i) a predicted log depth derivative (e.g., in the x direction and the y direction) and (ii) ground truth log depth derivatives, at multiple scales. The $L_{grad}$ term allows ML model 400 to recover sharp depth discontinuities and smooth gradient changes in dynamic depth image 412. $L_{sm}$ is configured to encourage smooth interpolation of depth in texture-less regions where MVS methods fail to determine depth values. $L_{sm}$ penalizes the $L_1$ norm of log depth derivatives based on the first- and second-order derivatives of images, and is applied at multiple scales. The $L_{sm}$ term encourages piecewise smoothness in depth regions where there is no image intensity change.

VIII. Example Depth-Based Visual Effects

Figure 8A:
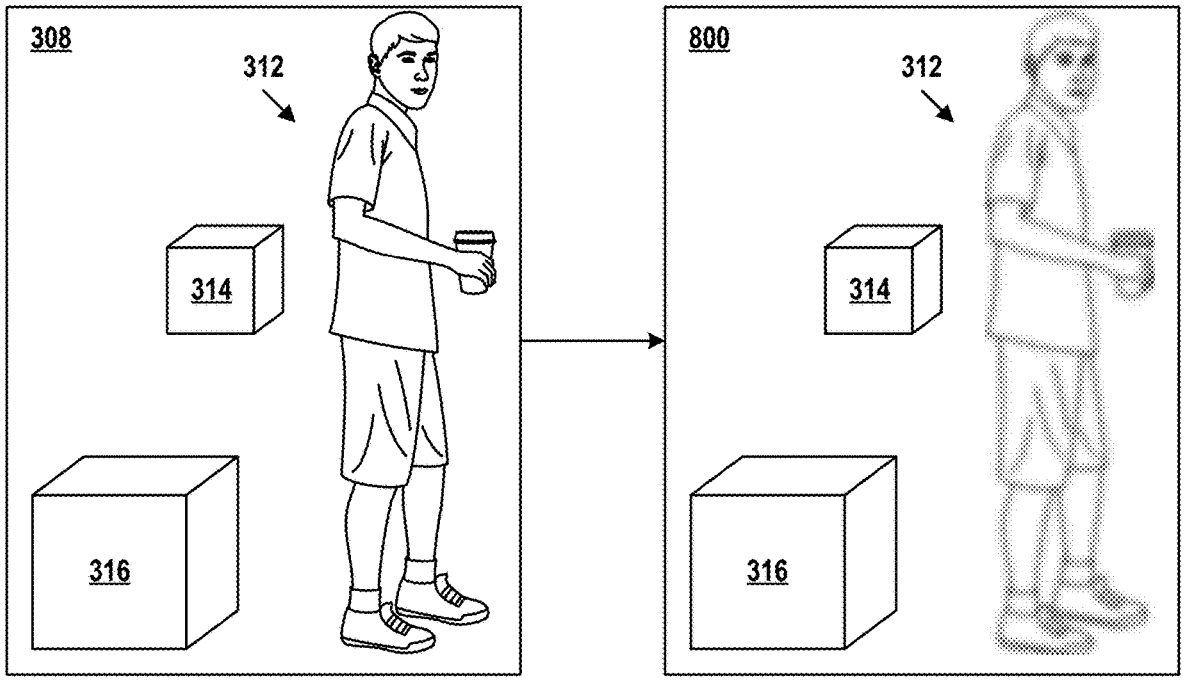
FIGS. 8A, 8B, 8C, and 8D illustrate depth-based visual effects, in accordance with example embodiments.

FIGS. 8A, 8B, 8C, and 8D illustrate example visual effects that may be applied to images within a video using the dynamic depth images determined for the video. FIG. 8A illustrates a focus effect applied to a portion of target image 308 based on the depth values represented by dynamic depth image 412. Specifically, image 800 illustrates a de-focused (i.e., blurry) representation of human 312. Pixel values of target image 308 in the region corresponding to human 312 may be modified according to the corresponding depth values represented by dynamic depth image 412 to generate such a focus effect. Additionally, a feature that is already de-focused in target image 308 may be modified to appear more in-focus in image 800. The focus effect may also be applied to other features of target image 308, such as boxes 314 and 316.

Figure 8B:
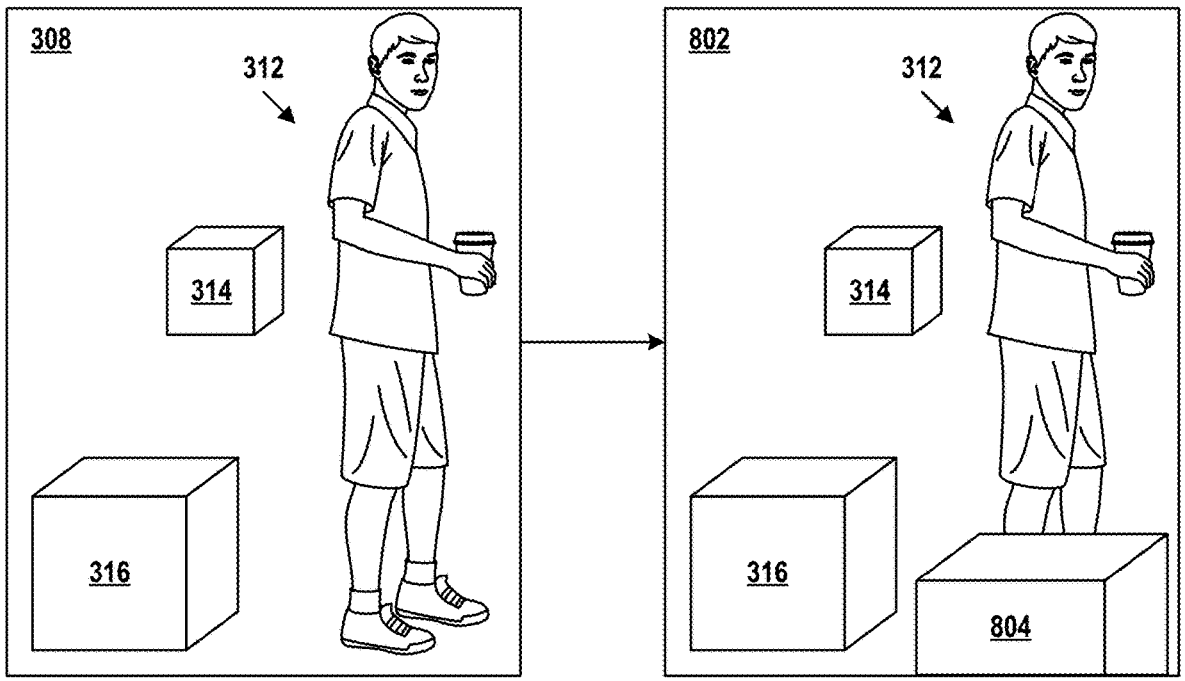

FIG. 8B illustrates a visual representation of an additional object inserted into target image 308 in a depth-aware manner. Specifically, a visual representation of box 804 is inserted into target image 308 at a position in front of human 312 to generate image 802. Since box 804 is inserted in front of human 312, the proper occlusion between portions of human 312 and box 804 may be generated and rendered to accurately represent the position of box 804. Namely, box 804, when placed in front of human 312, may occlude the feet and portions of the legs of actor 312. Accordingly, these portions of human 312 might not be rendered in image 802. Such occlusions may be determined based on the depth values represented by dynamic depth image 412, such that nearby objects occlude, and are thus rendered instead of, corresponding portions of image features that are more distant.

Figure 8C:
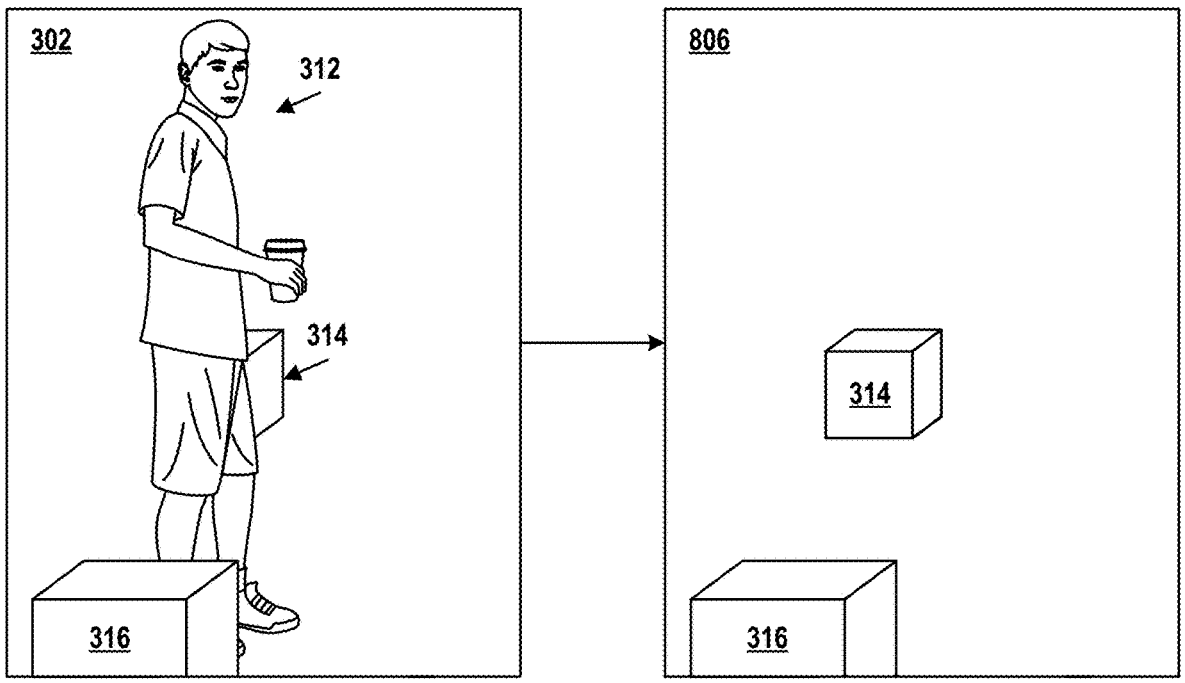

FIG. 8C illustrates a removal of a representation of a feature from an image. Specifically, the visual representation of human 312 is removed from image 302 to generate image 806. Portions of the environment that are occluded by human 312 in image 302 are inpainted in image 806 based on neighboring image frames within the video and the corresponding dynamic depth images. Thus, portions of the environment exposed by the removal of human 312 are rendered to represent the environment as it would otherwise appear if human 312 was not present in the image to begin with. As a result, the entirety of box 314 is shown in image 806.

In some implementations, a feature may be removed from image 302 when neighboring image frames provide sufficient visual data regarding the occluded portions of the environment. Moving features may be best suited for removal since, as these features move around the environment, some neighboring image frames in the video are likely to represent a given portion of the environment occluded by the moving feature and other neighboring image frames in the video are likely to represent the given portion of the environment unoccluded by the moving feature. A neighboring image may be used to inpaint a portion of an image from which a feature is removed by (i) determining a height field based on the dynamic depth image of the neighboring frame, (ii) texturing the height field based on the pixels of the neighboring image frame, and (iii) rendering the height field from the perspective of the image from which the feature is removed.

Figure 8D:
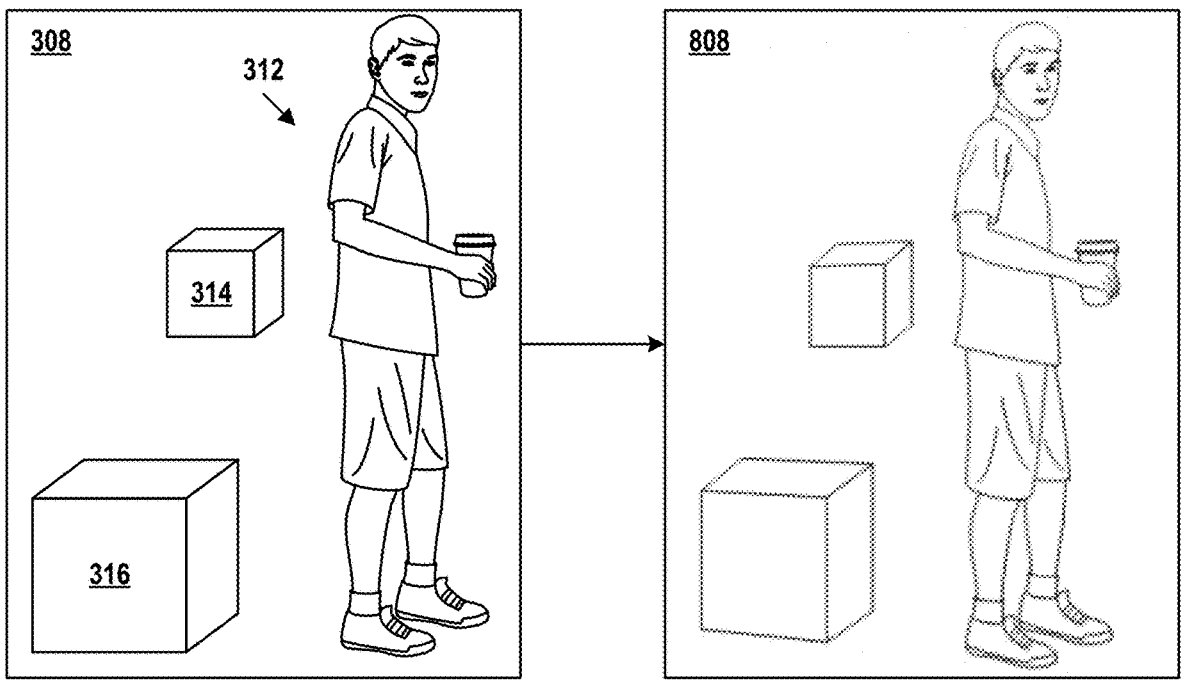

FIG. 8D illustrates a target image 308 modified to simulate a different view of the scene represented thereby. Specifically, image 808 simulates a rotation and translation of the camera relative to the pose shown in target image 308. Thus, image 808 represents a point of view different from that represented by target image 308. Portions of the environment that are not visible from the point of view of target image 308, but that become visible due to the simulated camera motion, are inpainted based on neighboring image frames within the video and the dynamic depth maps determined therefor. Frames in the video may be adjusted to simulate upward, downward, leftward, and rightward rotations and translations of the camera. This effect thus allows for a simulation of each image as a three-dimensional model by allowing the scene to be viewed from different points of view. The extent to which the initial point of view of the target image may be modified may depend on the extent of data available in neighboring images. Thus, when neighboring images represent large portions of the environment that are not shown in the target image, the extent of simulated rotation and/or translation may be commensurately large.

In further implementations, the dynamic depth images generated for images of the monoscopic video stream may be used to generate a stereoscopic video stream. Specifically, based on the depth of each image frame of the video, a right-eye image and a left-eye image may be generated. Successions of such right-eye and left-eye images may collectively form a stereoscopic video stream. In yet further implementations, other depth-based image effects may be generated based on the dynamic depth images generated for images of a video. Notably, the systems and operations herein disclosed may make such effects possible even though the initial video or images may be monoscopic and thus lacking explicit depth information.

IX. Additional Example Operations

Figure 9:
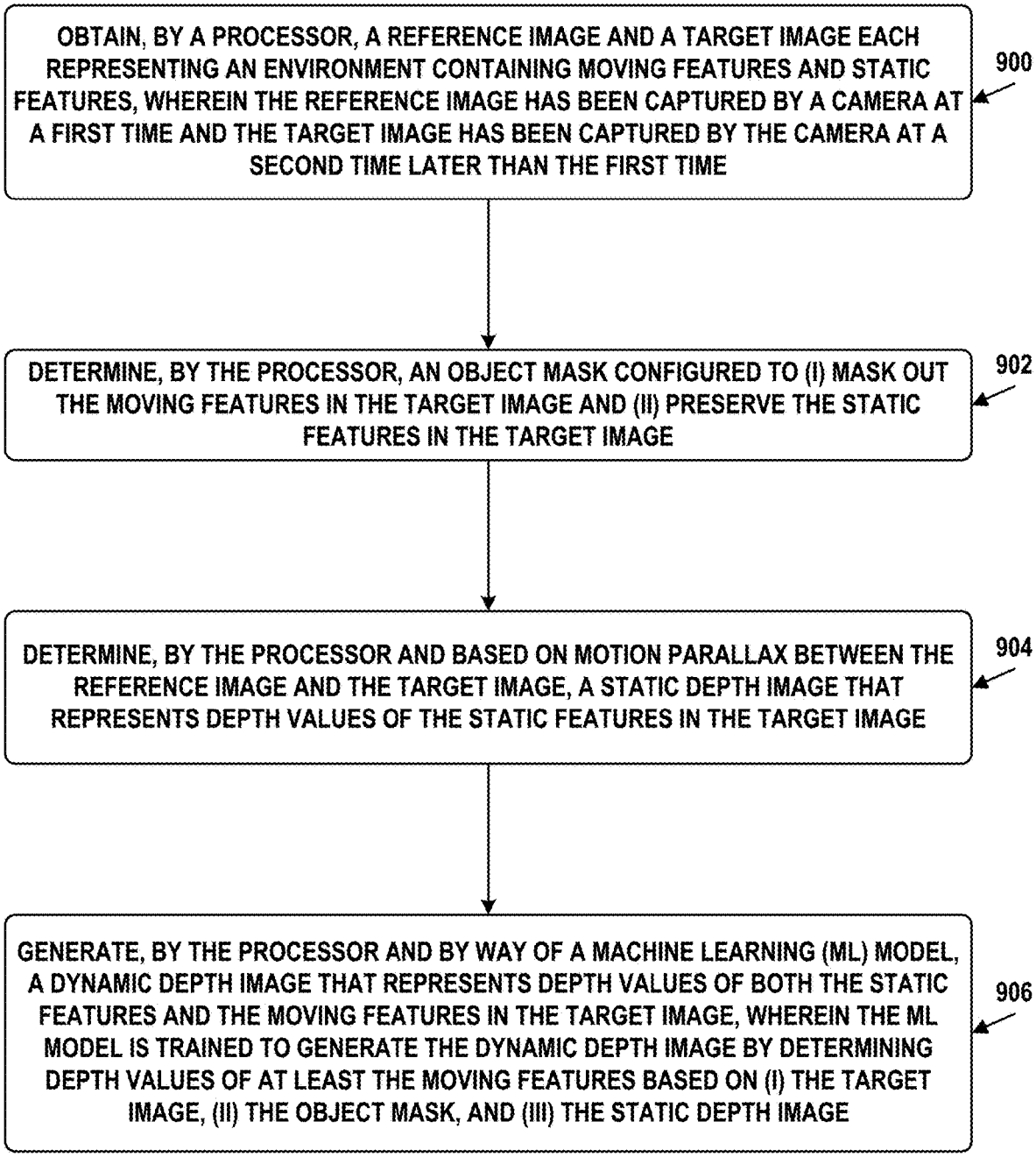
FIG. 9 illustrates a flow chart, in accordance with example embodiments.

FIG. 9 illustrates a flow chart of operations related to determining the depth of various features in an environment based on monoscopic image data. The operations may be carried out by, computing system 100 and/or computing device 200, among other possibilities. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining, by a processor, a reference image and a target image each representing an environment containing moving features and static features. The reference image may have been captured by a camera at a first time and the target image may have been captured by the camera at a second time later than the first time.

Block 902 may involve determining, by the processor, an object mask configured to (i) mask out the moving features in the target image and (ii) preserve the static features in the target image.

Bock 904 may involve determining, by the processor and based on motion parallax between the reference image and the target image, a static depth image that represents depth values of the static features in the target image.

Bock 906 may involve generating, by the processor and by way of an ML model, a dynamic depth image that represents depth values of both the static features and the moving features in the target image. The ML model may be trained to generate the dynamic depth image by determining depth values of at least the moving features based on (i) the target image, (ii) the object mask, and (iii) the static depth image.

In some embodiments, the object mask may include a binary image that assigns a first value to regions of the target image that contain the moving features and a second value to regions of the target image that contain the static features such that, when the static depth image is masked with the object mask, the moving features are removed from the static depth image and the static features are preserved in the static depth image.

In some embodiments, the moving features may include humans. Thus, the object mask may include one or more human-shaped regions.

In some embodiments, the ML model may be trained to generate the dynamic depth image by a training process that includes obtaining a plurality of videos. Each respective video of the plurality of videos may be captured by a respective camera moving through a respective training environment that contains (i) static training features and (ii) movable training features, and each of the movable training features may be fixed in a respective pose while being filmed by the respective camera. The training process may also include, for each respective video, determining a plurality of supervised depth images of scenes represented by the respective video. Each respective supervised depth image of the plurality of supervised depth images may be determined based on (i) a training reference image from the respective video that represent a respective scene from a first point of view and (ii) a training target image from the respective video that represent the respective scene from a second point of view different from the first point of view. The training process may additionally include determining parameters of the ML model based at least on the plurality of videos and the plurality of supervised depth images determined for each respective video.

In some embodiments, determining the parameters of the ML model may include, for each respective supervised depth image, determining a training object mask configured to (i) mask out the movable training features in the training target image and (ii) preserve the static training features in the training target image. Based on motion parallax between the training reference image and the training target image, a training static depth image may be determined that represents depth values of the static training features in the training target image. A training dynamic depth image that represents depth values of both the static training features and the movable training features in the training target image may be generated by way of the ML model. The ML model may generate the training dynamic depth image by determining depth values of at least the movable training features based on (i) the training target image, (ii) the training object mask, and (iii) the training static depth image. A difference between the training dynamic depth image and the respective supervised depth image may be determined and the parameters of the ML model may be adjusted to reduce the difference.

In some embodiments, the movable training features may include humans.

In some embodiments, the camera may be moving through the environment while capturing the reference image and the target image. At least some of the static features may maintain fixed poses within the environment between the first time and the second time. At least some of the moving features may change poses within the environment between the first time and the second time.

In some embodiments, determining the object mask may include processing the target image by way of an object instance segmentation algorithm configured to (i) determine outlines of instances of the moving features within the target image and (ii) inpaint the outlines to generate solid regions.

In some embodiments, determining the static depth image may include determining an optical flow image based on the reference image and the target image. A camera pose may be determined for the target image. A motion parallax depth image may be determined that represents depth values of both the static features and the moving features in the target image based on the optical flow image and the camera pose. The object mask may be applied to the motion parallax depth image to remove therefrom depth values of the moving features to thereby determine the static depth image.

In some embodiments, a confidence map may be determined. The confidence map may correspond to the static depth image and may indicate, for each respective pixel within the static depth image, a confidence value associated with the depth value of the respective pixel. Based on the confidence map and prior to providing the static depth image as input to the ML model, pixels associated with corresponding confidence values that are below a threshold confidence value may be removed from the static depth image.

In some embodiments, determining the confidence map may involve determining a left-right consistency between a forward optical flow field and a backward optical flow field each determined based on the target image and the reference image. An extent to which the forward optical flow field adheres to an epipolar constraint of the reference image and the target image may be determined. An extent of parallax between respective portions of the target image and the reference image may be determined. The confidence map may be determined based on a product of (i) the left-right consistency, (ii) the extent to which the forward optical flow field adheres to the epipolar constraint, and (iii) the extent of parallax.

In some embodiments, a focus effect may be applied to a selected feature of the target image based on the dynamic depth image.

In some embodiments, a visual representation of an object may be inserted into the target image at a selected position within the environment. Based on the dynamic depth image and the selected position, an occlusion between the visual representation of the object and at least one feature of the target image may be determined. The target image may be rendered to indicate the object, the at least one feature, and the occlusion therebetween.

In some embodiments, the reference image and the target image may form part of a video. A visual representation of a first moving feature of the moving features may be removed from the target image. Based on neighboring image frames within the video and the dynamic depth image, portions of the environment may be rendered that are occluded by the first moving feature to inpaint, within the target image, portions of the environment exposed by removal of the first moving feature.

In some embodiments, the reference image and the target image may form part of a video. Based on neighboring image frames within the video and the dynamic depth image, an additional image may be determined of a first point of view of the environment different from a second point of view represented by the target image. Determining the additional image may involve rendering portions of the environment that are (i) represented in the neighboring image frames, (ii) not represented in the target image, and (iii) visible from the different point of view of the additional image.

In some embodiments, the reference image and the target image may form part of a video generated by a monoscopic camera. A stereo video stream may be determined based on the video and the dynamic depth image. The stereo video stream may include a left-eye video stream and a right-eye video stream.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining, by a processor, a reference image and a target image each representing an environment containing moving features and static features, wherein the reference image has been captured by a camera at a first time and the target image has been captured by the camera at a second time later than the first time;
   determining, by the processor, an object mask configured to (i) mask out the moving features in the target image and (ii) preserve the static features in the target image;
   determining, by the processor and based on motion parallax between the reference image and the target image, a static depth image that represents depth values of the static features in the target image; and
   generating, by the processor and by way of a machine learning (ML) model, a dynamic depth image that represents depth values of both the static features and the moving features in the target image, wherein the ML model is trained to generate the dynamic depth image by determining depth values of at least the moving features based on (i) the target image, (ii) the object mask, and (iii) the static depth image.

2. The method of claim 1, wherein the object mask comprises a binary image that assigns a first value to regions of the target image that contain the moving features and a second value to regions of the target image that contain the static features such that, when the static depth image is masked with the object mask, the moving features are removed from the static depth image and the static features are preserved in the static depth image.

3. The method of claim 2, wherein the moving features comprise humans, and wherein the object mask comprises one or more human-shaped regions.

4. The method of claim 1, wherein the ML model is trained to generate the dynamic depth image by a process comprising:
   obtaining a plurality of videos, wherein each respective video of the plurality of videos is captured by a respective camera moving through a respective training environment that contains (i) static training features and (ii) movable training features, wherein each of the movable training features is fixed in a respective pose while being filmed by the respective camera;
   for each respective video, determining a plurality of supervised depth images of scenes represented by the respective video, wherein each respective supervised depth image of the plurality of supervised depth images is determined based on (i) a training reference image from the respective video that represent a respective scene from a first point of view and (ii) a training target image from the respective video that represent the respective scene from a second point of view different from the first point of view; and
   determining parameters of the ML model based at least on the plurality of videos and the plurality of supervised depth images determined for each respective video.

5. The method of claim 4, wherein determining the parameters of the ML model comprises, for each respective supervised depth image:
   determining a training object mask configured to (i) mask out the movable training features in the training target image and (ii) preserve the static training features in the training target image;
   determining, based on motion parallax between the training reference image and the training target image, a training static depth image that represents depth values of the static training features in the training target image; and
   generating, by way of the ML model, a training dynamic depth image that represents depth values of both the static training features and the movable training features in the training target image, wherein the ML model generates the training dynamic depth image by determining depth values of at least the movable training features based on (i) the training target image, (ii) the training object mask, and (iii) the training static depth image;
   determining a difference between the training dynamic depth image and the respective supervised depth image; and
   adjusting the parameters of the ML model to reduce the difference.

6. The method of claim 4, wherein the movable training features comprise humans.

7. The method of claim 1, wherein the camera is moving through the environment while capturing the reference image and the target image, wherein at least some of the static features maintain fixed poses within the environment between the first time and the second time, and wherein at least some of the moving features change poses within the environment between the first time and the second time.

8. The method of claim 1, wherein determining the object mask comprises processing the target image by way of an object instance segmentation algorithm configured to (i) determine outlines of instances of the moving features within the target image and (ii) inpaint the outlines to generate solid regions.

9. The method of claim 1, wherein determining the static depth image comprises:
   determining an optical flow image based on the reference image and the target image;
   determining a camera pose for the target image;
   determining a motion parallax depth image that represents depth values of both the static features and the moving features in the target image based on the optical flow image and the camera pose; and
   applying the object mask to the motion parallax depth image to remove therefrom depth values of the moving features to thereby determine the static depth image.

10. The method of claim 1, further comprising:
    determining a confidence map corresponding to the static depth image and indicating, for each respective pixel within the static depth image, a confidence value associated with the depth value of the respective pixel; and
    based on the confidence map and prior to providing the static depth image as input to the ML model, removing from the static depth image pixels associated with corresponding confidence values that are below a threshold confidence value.

11. The method of claim 10, wherein determining the confidence map comprises:
    determining a left-right consistency between a forward optical flow field and a backward optical flow field each determined based on the target image and the reference image;
    determining an extent to which the forward optical flow field adheres to an epipolar constraint of the reference image and the target image;
    determining an extent of parallax between respective portions of the target image and the reference image; and determining the confidence map based on a product of (i) the left-right consistency, (ii) the extent to which the forward optical flow field adheres to the epipolar constraint, and (iii) the extent of parallax.

12. The method of claim 1, further comprising:
applying a focus effect to a selected feature of the target image based on the dynamic depth image.

13. The method of claim 1, further comprising:
inserting into the target image a visual representation of an object at a selected position within the environment;
determining, based on the dynamic depth image and the selected position, an occlusion between the visual representation of the object and at least one feature of the target image; and
rendering the target image to indicate the object, the at least one feature, and the occlusion therebetween.

14. The method of claim 1, wherein the reference image and the target image form part of a video, and wherein the method further comprises:
removing from the target image a visual representation of a first moving feature of the moving features; and
rendering, based on neighboring image frames within the video and the dynamic depth image, portions of the environment that are occluded by the first moving feature to inpaint, within the target image, portions of the environment exposed by removal of the first moving feature.

15. The method of claim 1, wherein the reference image and the target image form part of a video, and wherein the method further comprises:
determining, based on neighboring image frames within the video and the dynamic depth image, an additional image of a first point of view of the environment different from a second point of view represented by the target image, wherein determining the additional image comprises rendering portions of the environment that are (i) represented in the neighboring image frames, (ii) not represented in the target image, and (iii) visible from the different point of view of the additional image.

16. The method of claim 1, wherein the reference image and the target image form part of a video generated by a monoscopic camera, and wherein the method further comprises:
determining a stereo video stream based on the video and the dynamic depth image, wherein the stereo video stream comprises a left-eye video stream and a right-eye video stream.

17. A non-transitory computer readable storage medium having stored thereon instructions that, when executed by a computing device, cause the computing device to perform operations comprising:
obtaining a reference image and a target image each representing an environment containing moving features and static features, wherein the reference image has been captured by a camera at a first time and the target image has been captured by the camera at a second time later than the first time;
determining an object mask configured to (i) mask out the moving features in the target image and (ii) preserve the static features in the target image;
determining, based on motion parallax between the reference image and the target image, a static depth image that represents depth values of the static features in the target image; and
generating, by way of a machine learning (ML) model, a dynamic depth image that represents depth values of both the static features and the moving features in the target image, wherein the ML model is trained to generate the dynamic depth image by determining depth values of at least the moving features based on (i) the target image, (ii) the object mask, and (iii) the static depth image.

18. The non-transitory computer readable storage medium of claim 17, wherein the ML model is trained to generate the dynamic depth image by a process comprising:
obtaining a plurality of videos, wherein each respective video of the plurality of videos is captured by a respective camera moving through a respective training environment that contains (i) static training features and (ii) movable training features, wherein each of the movable training features is fixed in a respective pose while being filmed by the respective camera;
for each respective video, determining a plurality of supervised depth images of scenes represented by the respective video, wherein each respective supervised depth image of the plurality of supervised depth images is determined based on (i) a training reference image from the respective video that represent a respective scene from a first point of view and (ii) a training target image from the respective video that represent the respective scene from a second point of view different from the first point of view; and
determining parameters of the ML model based at least on the plurality of videos and the plurality of supervised depth images determined for each respective video.

19. The non-transitory computer readable storage medium of claim 18, wherein determining the static depth image comprises:
determining an optical flow image based on the reference image and the target image;
determining a camera pose for the target image;
determining a motion parallax depth image that represents depth values of both the static features and the moving features in the target image based on the optical flow image and the camera pose; and
applying the object mask to the motion parallax depth image to remove therefrom depth values of the moving features to thereby determine the static depth image.

20. A system comprising:
a camera configured to generate a reference image and a target image each representing an environment containing moving features and static features, wherein the reference image is generated at a first time and the target image is generated at a second time later than the first time;
computing hardware configured to:
determine an object mask configured to (i) mask out the moving features in the target image and (ii) preserve the static features in the target image; and
determine, based on motion parallax between the reference image and the target image, a static depth image that represents depth values of the static features in the target image; and
a machine learning (ML) model configured to generate a dynamic depth image that represents depth values of both the static features and the moving features in the target image, wherein the ML model is trained to generate the dynamic depth image by determining depth values of at least the moving features based on (i) the target image, (ii) the object mask, and (iii) the static depth image.

* * * * *